(12) United States Patent
Evans et al.

(10) Patent No.: US 9,403,448 B1
(45) Date of Patent: Aug. 2, 2016

(54) TRANSFER SEAT BASE WITH PEDAL GUARD ASSEMBLY

(71) Applicants: John A. Evans, Mount Carmel, IL (US); Larry D. Michels, Olney, IL (US); Travis D. Rigg, Albion, IL (US)

(72) Inventors: John A. Evans, Mount Carmel, IL (US); Larry D. Michels, Olney, IL (US); Travis D. Rigg, Albion, IL (US)

(73) Assignee: B & D Independence, Inc., Mount Carmel, IL (US)

( * ) Notice: Subject to any disclaimer, the term of this patent is extended or adjusted under 35 U.S.C. 154(b) by 0 days.

(21) Appl. No.: 14/449,724

(22) Filed: Aug. 1, 2014

Related U.S. Application Data

(60) Provisional application No. 62/013,534, filed on Jun. 17, 2014.

(51) Int. Cl.
| | | |
|---|---|---|
| *B60N 2/24* | (2006.01) | |
| *B60N 2/06* | (2006.01) | |
| *B60N 2/14* | (2006.01) | |
| *B60N 2/07* | (2006.01) | |
| *B60N 2/16* | (2006.01) | |
| *B60N 2/08* | (2006.01) | |
| *G05G 5/00* | (2006.01) | |

(52) U.S. Cl.
CPC ......... *B60N 2/245* (2013.01); *B60N 2/07* (2013.01); *B60N 2/08* (2013.01); *B60N 2/14* (2013.01); *B60N 2/16* (2013.01); *G05G 5/005* (2013.01)

(58) Field of Classification Search
CPC ...... B60N 2/02; B60N 2/0224; B60N 2/0232; B60N 2/04; B60N 2/06; B60N 2/08; B60N 2/14; B60N 2/146; B60N 2/16; B60N 2/162; B60N 2/245

USPC ........... 296/1.04, 65.01, 65.04, 65.13, 65.15, 296/68.1; 297/1, 344.1, 344.21, 344.24, 297/487; 180/287; 70/237, 261

See application file for complete search history.

(56) References Cited

U.S. PATENT DOCUMENTS

| | | | | |
|---|---|---|---|---|
| 4,632,209 A | * | 12/1986 | Russell | B60R 25/006 180/287 |
| 4,747,465 A | * | 5/1988 | Hodgson | B60R 25/006 180/287 |
| 4,846,529 A | * | 7/1989 | Tulley | B60N 2/0232 297/330 |
| 5,213,388 A | * | 5/1993 | Baker | B60N 2/0717 180/287 |
| 6,572,172 B1 | | 6/2003 | Ninomiya et al. | |
| 9,016,797 B2 | * | 4/2015 | Iida | B60N 2/0252 280/250.1 |
| 2001/0038223 A1 | | 11/2001 | Suga et al. | |
| 2008/0224522 A1 | | 9/2008 | Taguchi et al. | |

OTHER PUBLICATIONS

International Search Report and Written Opinion dated Mar. 3, 2015, Application No. PCT/US2014/063835, 7 pages.

* cited by examiner

*Primary Examiner* — Jason S Daniels
(74) *Attorney, Agent, or Firm* — R. Randall Frisk

(57) ABSTRACT

A transfer seat base for a vehicle having a floor includes a rail frame configured for connection to a vehicle floor; a carriage frame mounted for longitudinal movement relative to the rail frame and including a top plate for receipt of a seat mountable thereto, a lift assembly for enabling selective vertical movement of the top plate relative to the rail frame, and a rotation assembly for enabling selective rotation of the top plate relative to the rail frame; a motive mechanism for selectively moving the carriage frame along the rail frame between a forward driving position and a rearward occupant transfer position; a pedal guard assembly including a base plate connected to the carriage frame, a guard plate hingedly connected to the base plate to pivot between a down, rest position and an up, guard position and a locking mechanism for releasably locking the guard plate in the up, rest position.

31 Claims, 21 Drawing Sheets

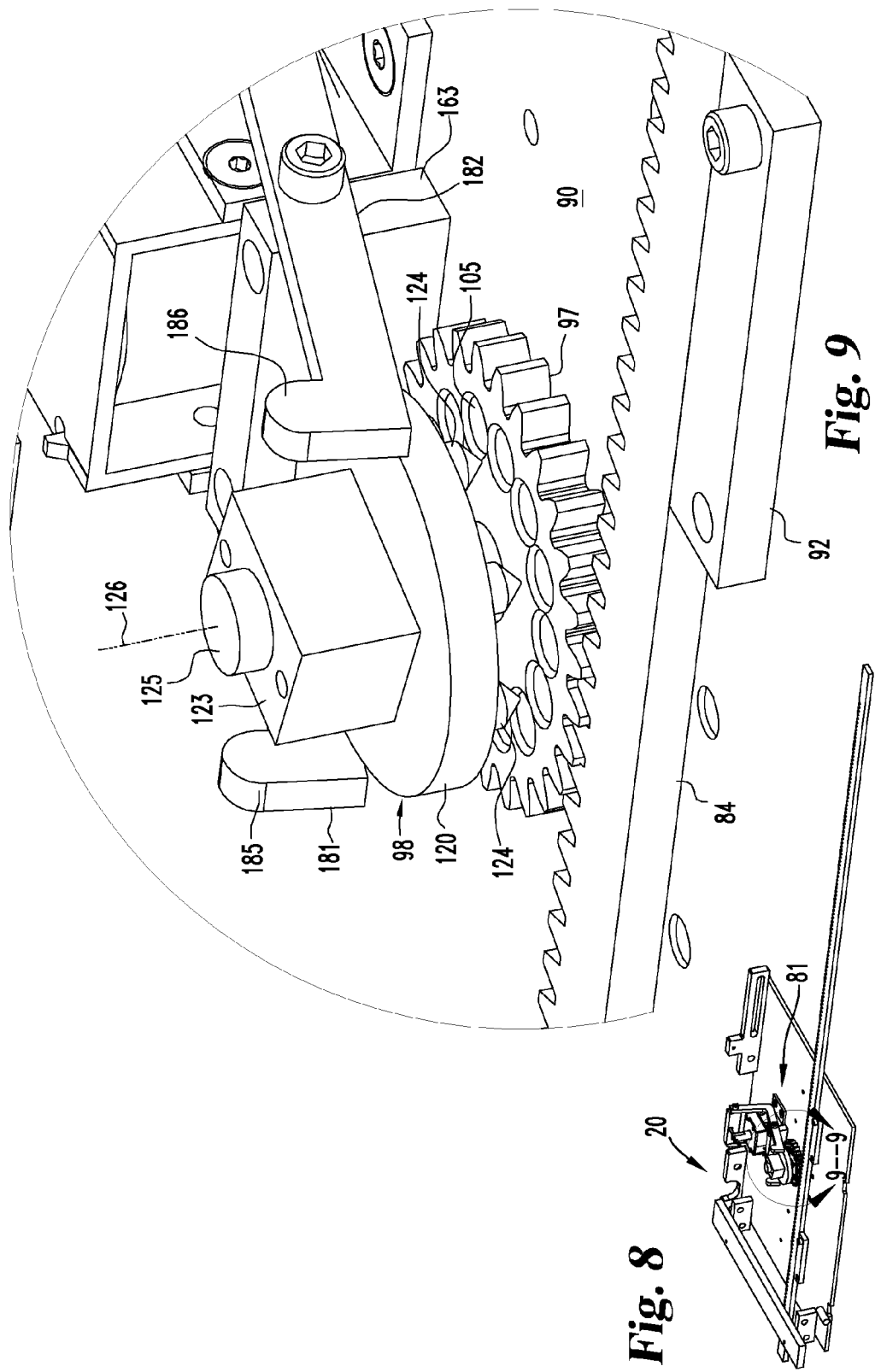

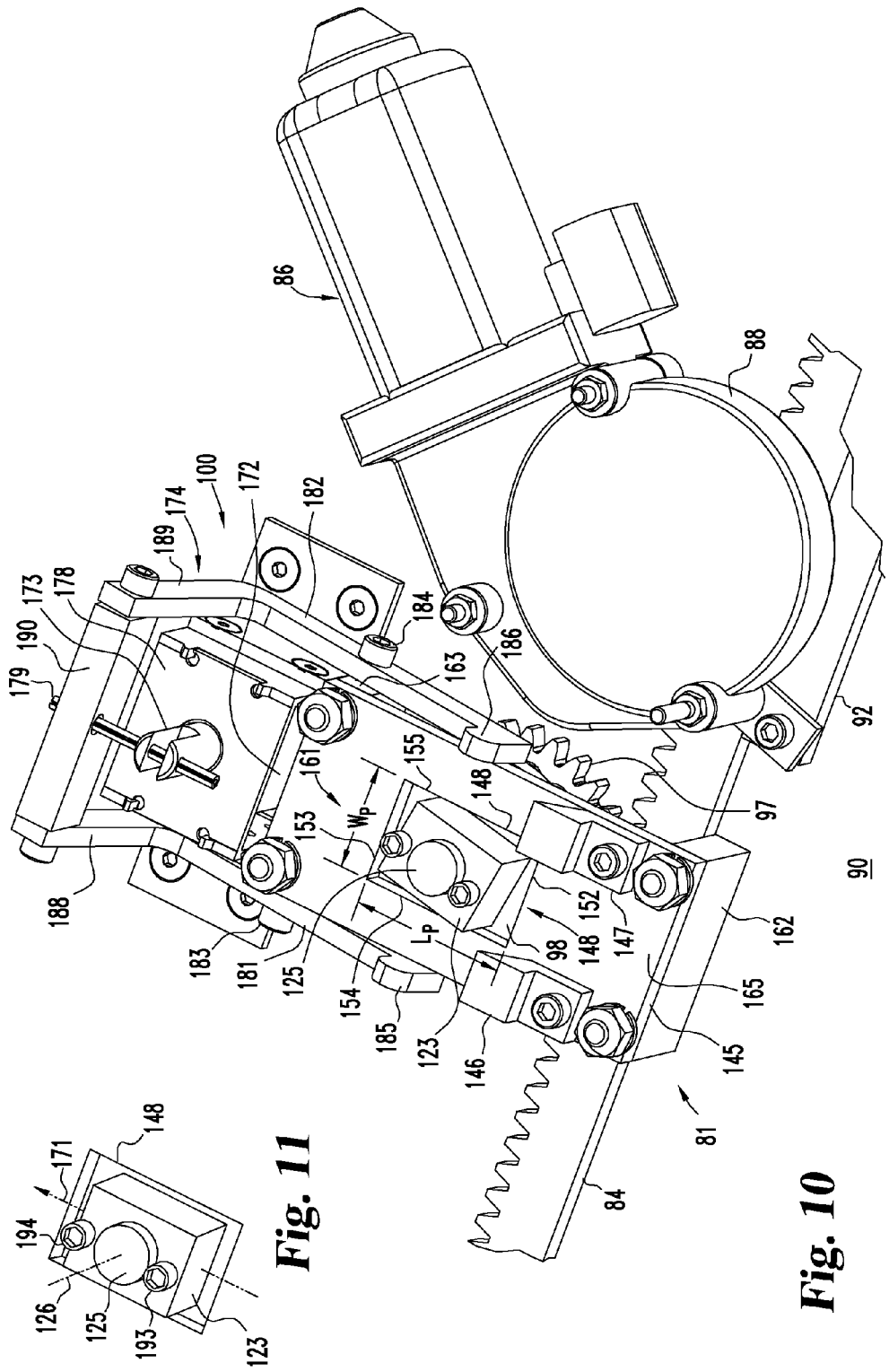

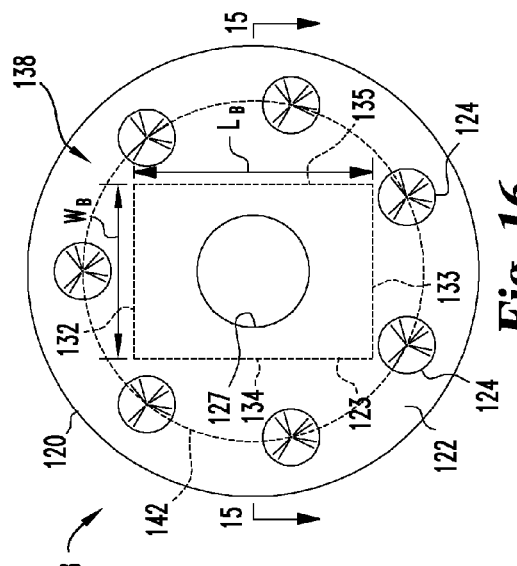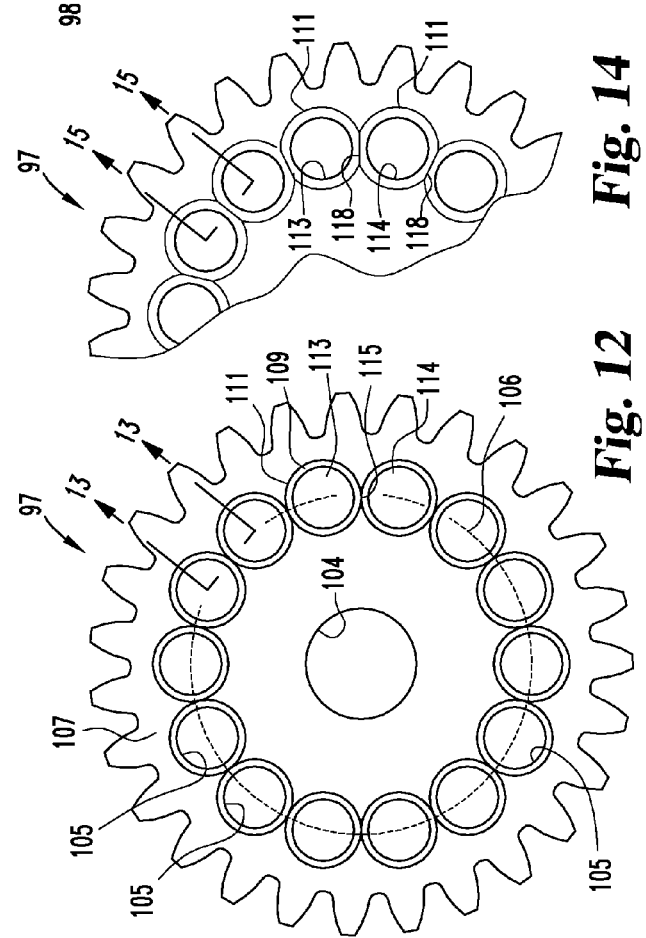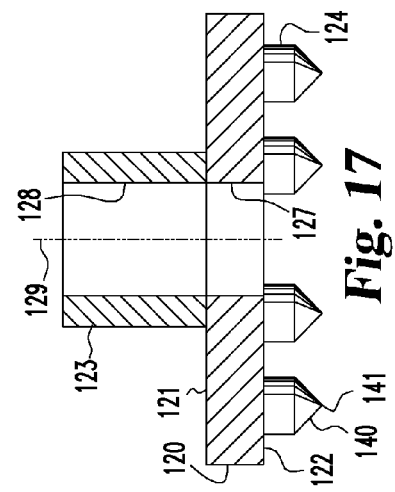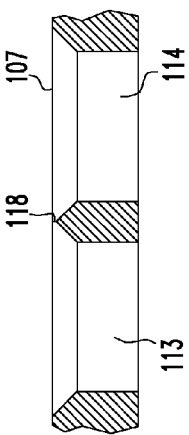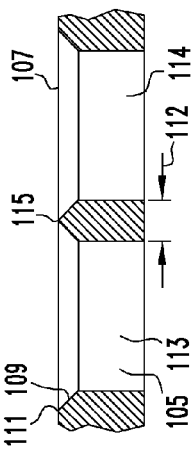
Fig. 12
Fig. 13
Fig. 14
Fig. 15
Fig. 16
Fig. 17

TRANSFER SEAT BASE WITH PEDAL GUARD ASSEMBLY

CROSS-REFERENCE TO RELATED APPLICATION

This application claims the benefit of Provisional Patent Application No. 62/013,534, filed Jun. 17, 2014, which application is hereby incorporated by reference in its entirety.

FIELD OF THE INVENTION

This invention relates to vehicle seats adapted for use with mobility devices, and more particularly, to vehicle transfer seats with pedal guards.

BACKGROUND OF THE INVENTION

Persons with physical disabilities are often enabled to drive by converting a van or similar vehicle to accommodate the particular mobility device (wheelchair) being used. For example, some systems enable the wheelchair to maneuver right up to a driving position behind the steering wheel and there be securely locked in place, the driver then operating the vehicle still seated in his wheelchair. In other cases, the vehicle's OEM seat is remounted atop a seat transfer base. The driver maneuvers his wheelchair up close to the seat and seat transfer base combination and, using controls on the seat transfer base, moves the seat to a desired position next to his wheelchair so that he can then most effectively slide himself from the wheelchair seat to the vehicle seat. The same seat transfer base controls are then used to move the vehicle seat back to its home position, facing forward and proximal to the steering wheel. Able bodied drivers can readily use this seat/seat transfer base combination wherein the vehicle's pedals (i.e. gas and brake pedals) are unchanged and are accessible just as in a similar and unmodified vehicle. For some drivers, however, who do not have full control over their lower limbs, it is preferable that the pedals be deactivated or access thereto be restricted so that the pedals cannot be inadvertently activated. Such deactivation or restriction would inhibit use by an able bodied driver. What is desired is mechanism for use with a vehicle seat transfer base that selectively inhibits activation of the vehicle's pedals.

SUMMARY OF THE INVENTION

Generally speaking, there is provided a transfer seat base for a vehicle with a pedal guard assembly that includes a guard plate that pivots between a down, rest position and an up, guard position essentially blocking access by the driver of vehicle to vehicle's pedals.

A transfer seat base for a vehicle having a floor includes a rail frame configured for connection to a vehicle floor; a carriage frame mounted for longitudinal movement relative to the rail frame and including a top plate for receipt of a seat mountable thereto, a lift assembly for enabling selective vertical movement of the top plate relative to the rail frame, and a rotation assembly for enabling selective rotation of the top plate relative to the rail frame; a motive mechanism for selectively moving the carriage frame along the rail frame between a forward driving position and a rearward occupant transfer position; a pedal guard assembly including a base plate connected to the carriage frame, a guard plate hingedly connected to the base plate to pivot between a down, rest position and an up, guard position and a locking mechanism for releasably locking the guard plate in the up, rest position It is an object of the present invention to provide an improved mechanism for use with a seat transfer base for a handicapped accessible vehicle that selectively inhibits access to and activation of the vehicle's pedals.

Other objects and advantages will become apparent from the following description of the preferred embodiment.

BRIEF DESCRIPTION OF THE DRAWINGS

FIG. 8 is a right side and front perspective view of a portion of the carriage frame 20 and variable locking assembly 81 of the transfer seat base 10 of FIG. 5.

FIG. 9 is an enlarged view of the carriage frame 20 and variable locking assembly 81 of FIG. 8 and taken in with the detail circle 9-9 and showing the rocker arms 181 and 182 in the unlocked position.

FIG. 10 is an enlarged, right side and front perspective view of a portion of the variable locking assembly 81 of the transfer seat base 10 of FIG. 5.

FIG. 11 is a perspective view of the upper block 123 rotated to the centered position 171 within alignment hole 148.

FIG. 12 is a plan view of the locking pinion 97 of the variable locking assembly 81 of the transfer seat base 10 of FIG. 9.

FIG. 13 is a side, cross-sectional view of the locking pinion 97 of FIG. 12 taken along the lines 13-13 and viewed in the direction of the arrows.

FIG. 14 is a plan view of a portion of the locking pinion 97 of FIG. 12 in accordance with another embodiment of the present invention.

FIG. 15 is a side, cross-sectional view of the locking pinion 97 of FIG. 12 taken along the lines 15-15 and viewed in the direction of the arrows.

FIG. 16 is a bottom view of the lock plate assembly 98 of the transfer seat base 10 of FIG. 9.

FIG. 17 is a side, cross-sectional view of the lock plate assembly 98 of FIG. 16 taken along the lines 17-17 and viewed in the direction of the arrows.

DESCRIPTION OF THE PREFERRED EMBODIMENT

Figure 1:
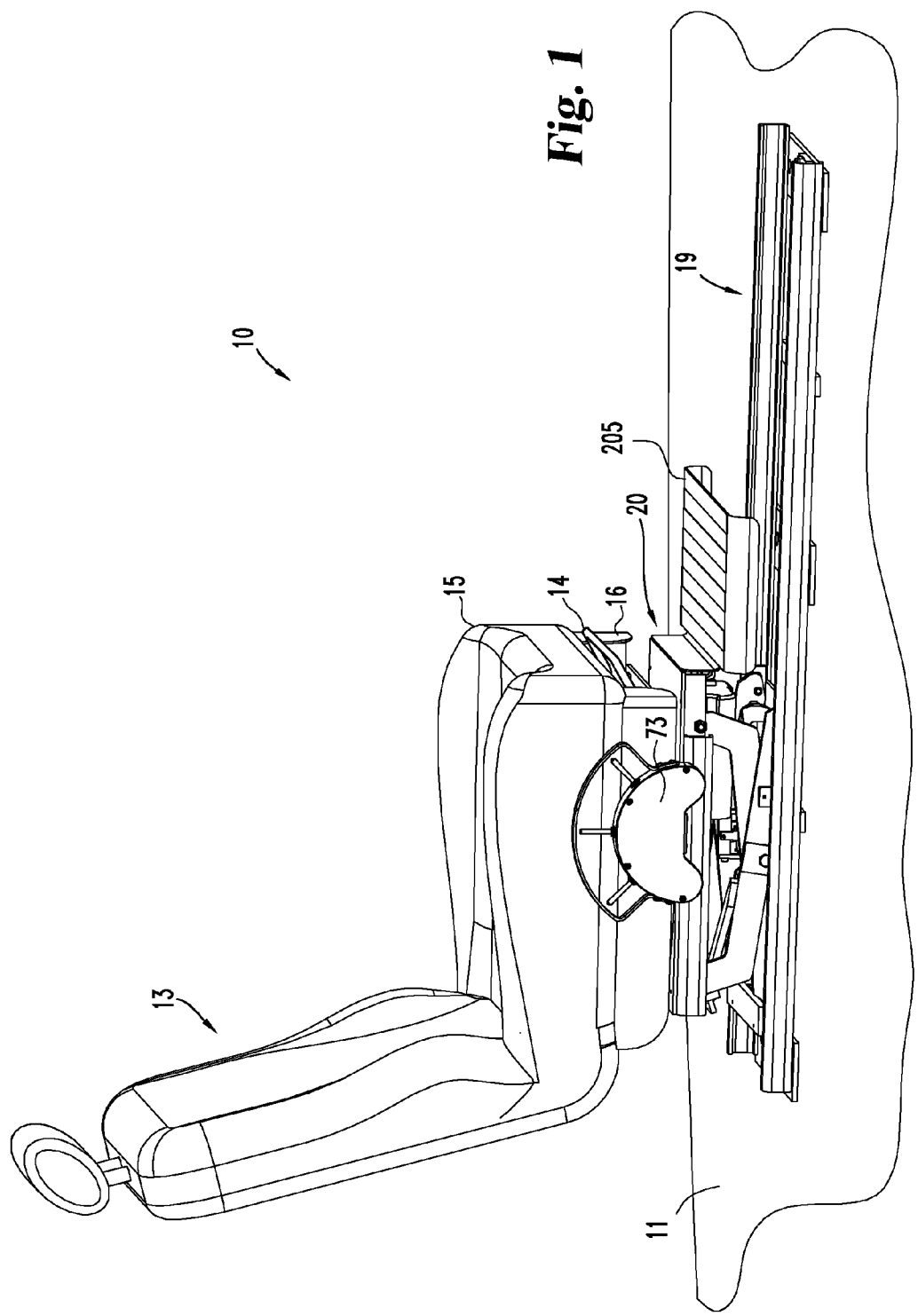
FIG. 1 is a right side perspective view of a transfer seat base 10 in accordance with one embodiment of the present invention and with a vehicle seat 13 mounted thereon.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations or modifications in the illustrated device, and any further applications of the principles of the invention as illustrated therein are contemplated as would normally occur to one skilled in the art to which the invention relates.

Referring to FIG. 1, there is shown a transfer seat base 10 in accordance with the present invention. Transfer seat base 10 is configured for mounting to the floor 11 of a handicapped accessible vehicle and for receipt of an OEM or other seat 13 mounted to the top thereof. It is customary that such OEM seat 13 be provided with some degree of positional adjustability, typically at least along a longitudinal (front to back) axis relative to the vehicle, and that it include a locking mechanism (not shown) to releasably lock the seat 13 in the desired longitudinal position. For seat 13, the OEM locking mechanism is momentarily releasable by pulling a locking handle 14 located between the seat's lower cushion 15 and its base 16.

Referring to FIGS. 1-5, transfer seat base 10 generally includes a rail frame 19, a carriage frame 20, a motive mechanism 21 and a transfer seat base locking mechanism 22. Rail frame 19 includes left and right, C-cross-sectioned rails 24 and 25, respectively, and a plurality of cross members 26, which include forward and rearward cross members 27 and 28, respectively, all of which rigidly connect rails 24 and 25 together in a mutually parallel and mirror image position, as shown. As used herein, "rigidly" connected means a secure, substantially, if not completely immovable connection between two or more elements. Such connection can be by any appropriate means, often including welding or bolts, and such connection can be permanent or it can be removable or variable where such removal or variability does not conflict with the purpose or reasonable operation of the element(s) involved. Rail frame 19 is rigidly affixed to the vehicle floor 11 by any appropriate means, such as bolts (not shown) through holes 29 defined in cross members 26. Connecting transfer seat base 10 to the vehicle floor of course contemplates connection to any structure of the vehicle that positions transfer seat base 10 in the desired position rearwardly of the vehicle's steering wheel, that is, where any other driver's seat would be located in a vehicle.

Figure 2:
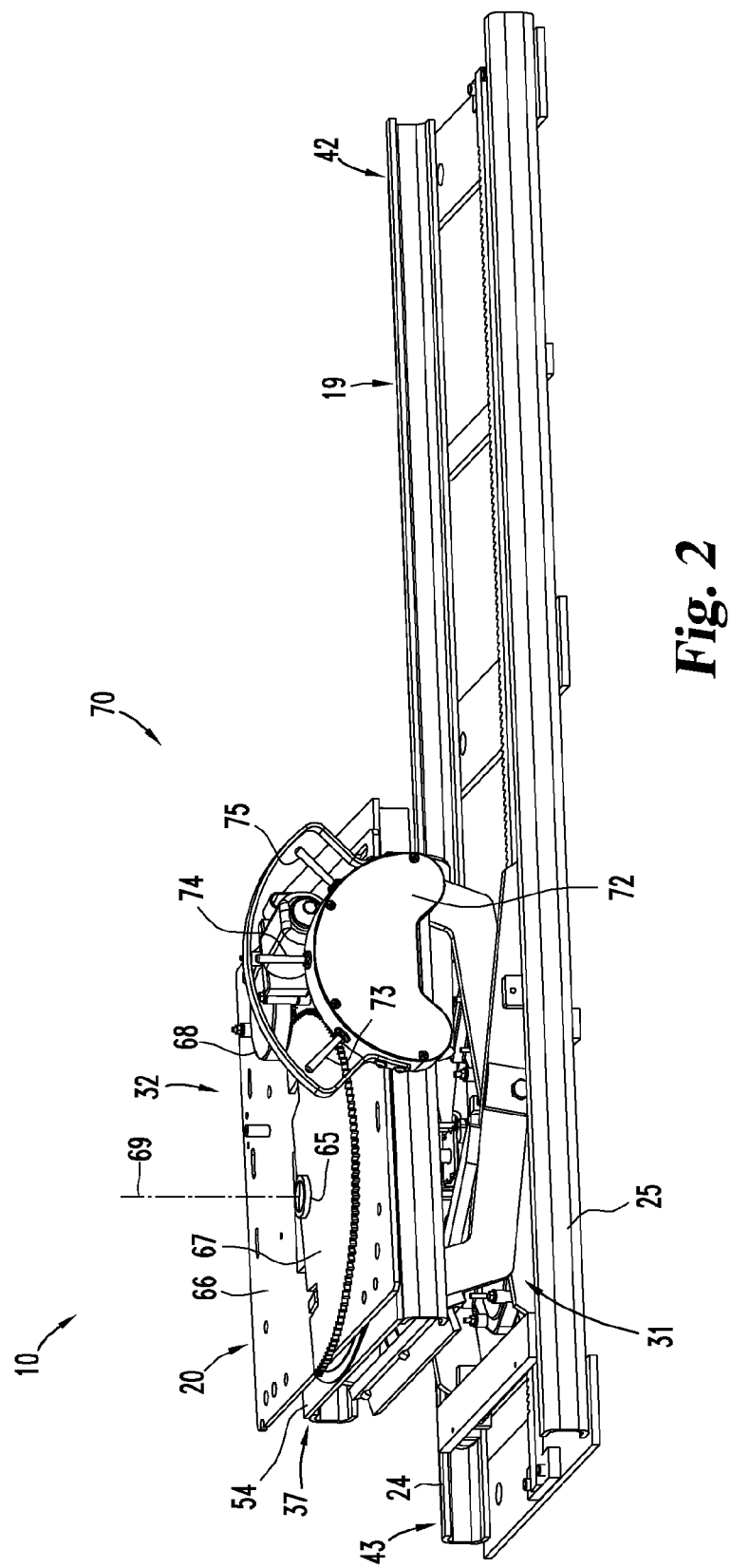
FIG. 2 is a right side and slightly rear perspective view of the transfer seat base 10 of FIG. 1.
Figure 3:
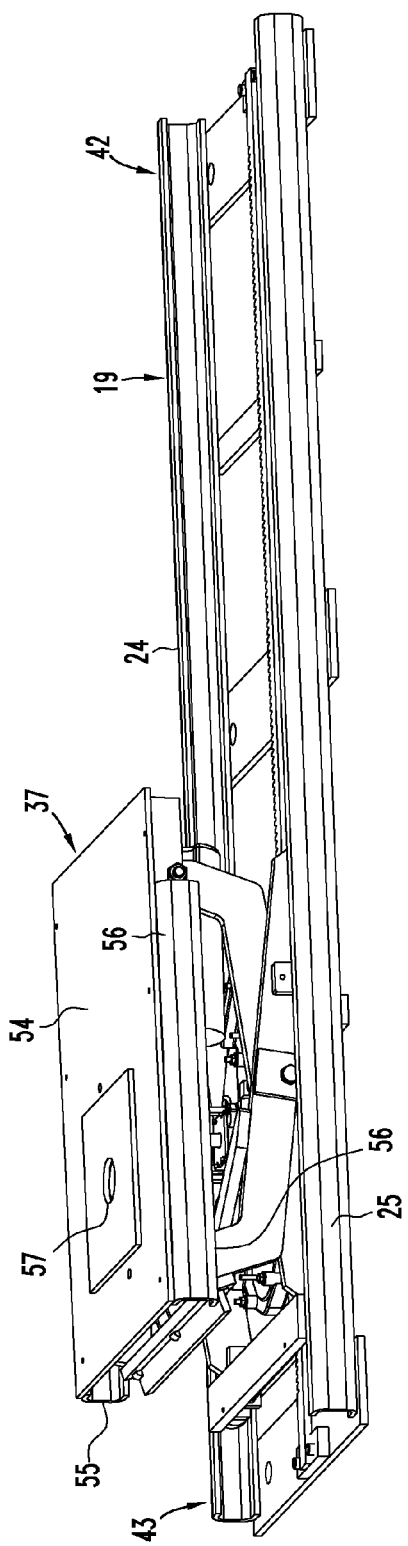
FIG. 3 is a right side and slightly rear perspective view of the transfer seat base 10 of FIG. 2 and with switch assembly 72, top plate 66 and rotation assembly 32 removed.
Figure 4:
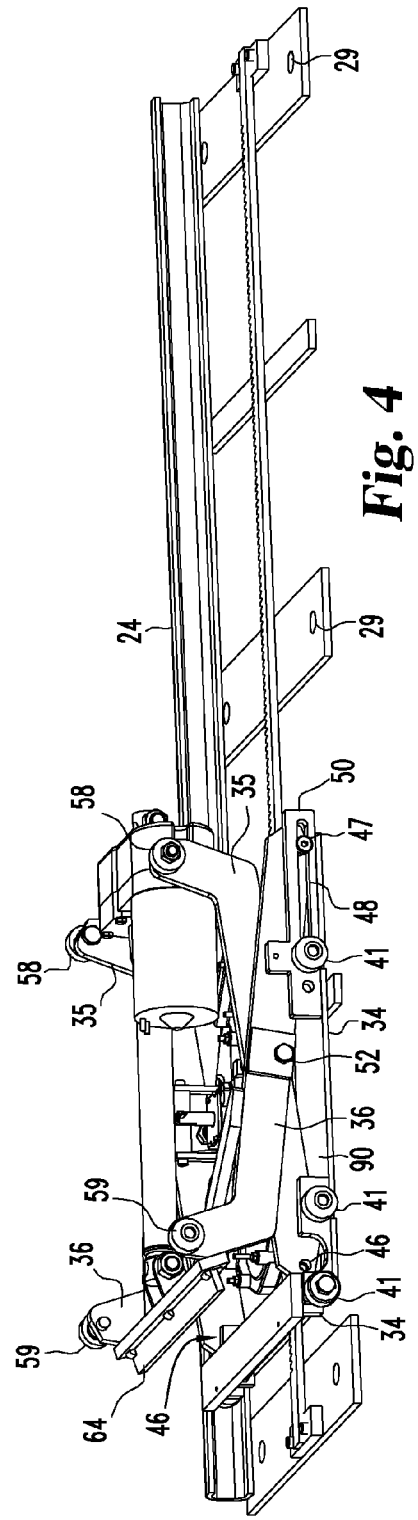
FIG. 4 is a right side and slightly rear perspective view of the transfer seat base 10 of FIG. 3 and with top plate assembly 37 removed.

Referring to FIGS. 2-5, carriage frame 20 includes a lift assembly 31 and a rotation assembly 32. Lift assembly 31 is a scissor-type lift assembly and includes a base frame 34, opposing pairs of inner and outer scissor arms 35 and 36, an upper plate assembly 37 and an actuator assembly 38. Referring to FIGS. 3 and 4, base frame 34 includes a plurality of rollers 41 that ride within the opposing, C-cross-sectioned rails 24 and 25 and enable base frame 34 to move between the front and rear ends 42 and 43, respectively, of rail frame 19. Opposing inner scissor arms 35 are rotatably connected at their lower, rear ends at 45 and 46 to the rear of base frame 34, and opposing outer scissor arms 36 have follower rollers (only the right roller 47 shown, FIG. 4) at their lower, front ends, which rollers are constrained to follow within longitudinal slots (only the right slot 48 shown, FIG. 4) defined in upstanding walls 49 and 50 of base frame 34, as shown. Generally midway between their upper and lower ends, the left and right inner scissor arms 35 and corresponding left and right outer scissor arms 36 are rotatably mounted together (at 51 and 52, respectively) to pivot in scissor fashion, as is well known for such scissor lift assemblies.

Upper plate assembly 37 includes an upper plate 54 with a reinforced hole (at 57) and left and right, C-cross-sectioned rails 55 and 56 rigidly connected to its outer edges, as shown. Rollers 58 mounted to the upper, front ends of inner scissor arms 35 and rollers 59 mounted to the upper, rear ends of outer scissor arms 36 are positioned to ride within the opposing, C-cross-sectioned rails 55 and 56. Inner scissor arm bracing 62 extends between and rigidly connects the upper, front ends of inner scissor arms 35, and outer scissor arm bracing 63 extends between and rigidly connects the upper, rear ends of outer scissor arms 36.

Actuator assembly 38 includes any appropriate linear motion drive unit, such as a linear or screw driven actuator 64, which is mounted between the inner and outer scissor arm bracings 62 and 63. Retraction and extension of the actuator 64 moves inner and outer scissor arm bracings 62 and 63, and thus the upper ends of inner scissor arms 35 toward and away from the upper ends of outer scissor arms 36 which, because the lower, rear ends of inner scissor arms 35 are pivotally mounted to base frame 34, causes the upper ends of scissor arms 35 and 36, and the upper plate 54 rollably connected therewith, to rise and fall, respectively, relative to base frame 34.

Referring to FIGS. 2 and 3, rotation assembly 32 includes a top plate 66, a hemi-circular gear plate 67 and a drive motor 68. Top plate 66 is mounted via a bearing sleeve (not shown) to upper plate 54 for rotation about an axis 69 that is coaxial with that of hole 57. Gear plate 67 includes a radially central post (the top of which is visible at 65) that is rigidly connected with gear plate 67 and extends down through the bearing sleeve (not shown) of top plate 66, where it is rigidly connected to upper plate 54 at hole 57. Drive motor 68 has a pinion (not shown) and is mounted atop top plate 66 so that its pinion engages with gear plate 67. Since gear plate 67 is immovably fixed to upper plate 54, actuation of drive motor 68 thus causes it (gear motor 68) and its top plate 66 to rotate about axis 69 from a forward, home position 70 to a transfer position (not shown) rotated 90 degrees clockwise therefrom.

A switch assembly 72 is mounted to top plate 66 so that it rotates with top plate 66 (and thus with the seat 13 mounted thereto). Top plate 66 could, of course, be or include any appropriate other structure to which the seat 13 is mounted. Switch assembly 72 provides user actuation switches 73, 74 and 75, which operate drive motor 68, linear actuator 64, and the drive motors 85 and 86 of transfer seat mechanism 10, respectively, as described below. Wiring, power supplies, fasteners and other ancillary components of the invention are naturally contemplated and included in the invention, but are sufficiently well known in the art that they are not otherwise needed to be shown or discussed. With seat 13 mounted atop top plate 66, actuation of the appropriate switch of switch assembly 72 will move seat 13 up and down and will rotate seat 13 between the forward (facing), home position 70 and the rotated-to-the-right, transfer position (not shown). Seat 13 is shown in FIG. 1 in a down position and in the forward (facing), home position.

Figure 5:
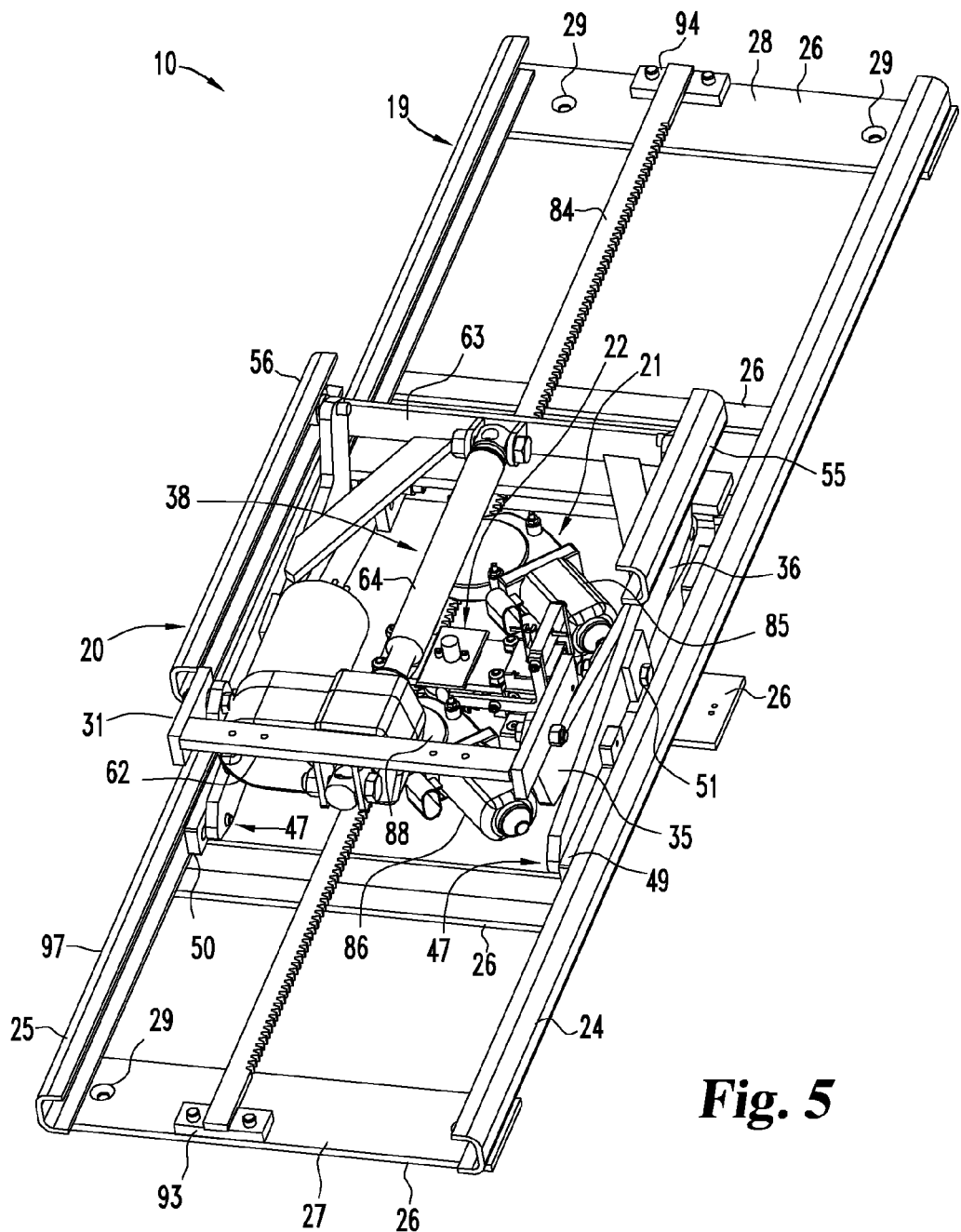
FIG. 5 is a left side and front perspective view of the transfer seat base 10 of FIG. 4.
Figure 7:
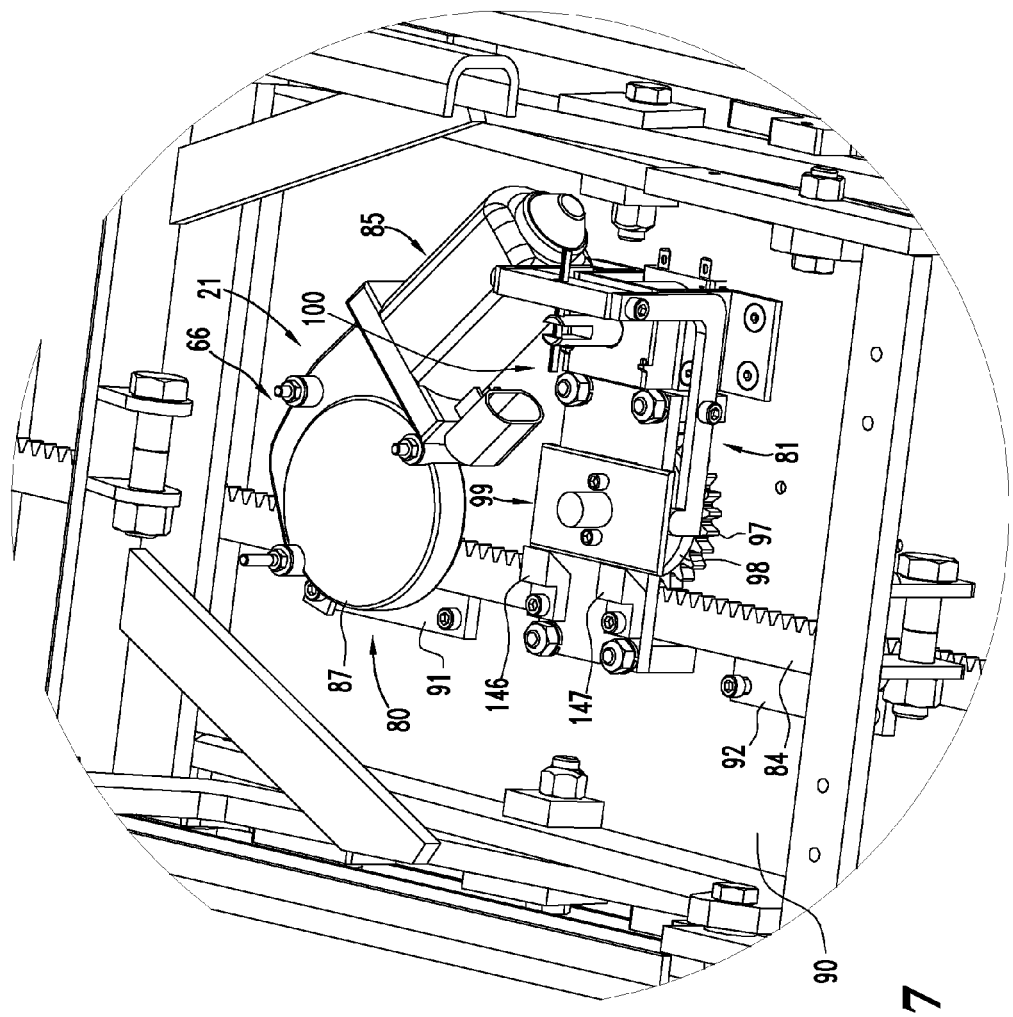
FIG. 7 is an enlarged view of a portion of the transfer seat base 10 of FIG. 6 and taken in with the detail circle 7-7.
Figure 6:
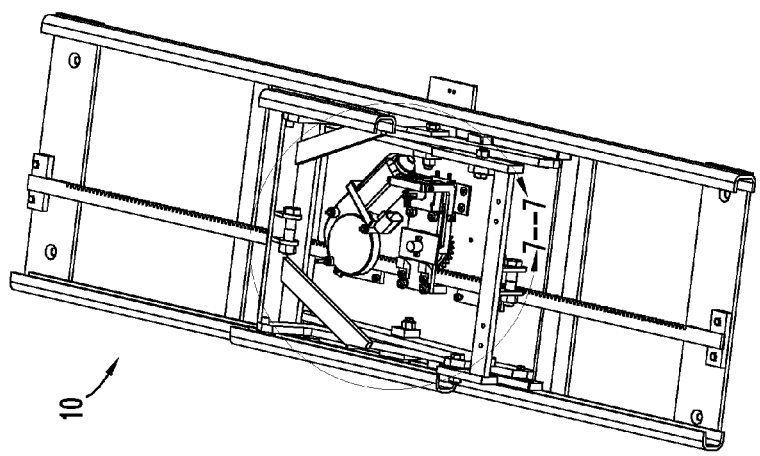
FIG. 6 is a left side and front perspective view of the transfer seat base 10 of FIG. 5, showing the location of detail enlargement for FIG. 7, and with drive motor 88 removed.

Referring to FIGS. 5, 7 and 10, motive mechanism 21 comprises a rack and pinion drive assembly 80, which includes a rack 84 and, here, two drive motors 85 and 86, each with a drive pinion (not shown, but located inside of and extending below the drive motor housings 87 and 88 of the drive motors 85 and 86, respectively, and positioned to engage with rack 84). Drive motors 85 and 86 are mounted to the base plate 90 of carriage frame 20, one on each side of variable locking assembly 81. Guide bars 91 and 92, also mounted to base plate 90, hold rack 84 in meshing engagement with the pinions of guide motors 85 and 86, and rack 84 is fixedly mounted at its opposing ends to the forward and rearward cross members 27 and 28 of rail frame 19, respectively, via rack mounting brackets 93 and 94. Actuation of drive motors 85 and 86, which are connected to the carriage frame base plate 90, thus moves carriage frame 20 and all connected with it (including seat 13) longitudinally along rack 84 between a forward driving position and a rearward occupant transfer position.

Referring to FIGS. 7 and 10, transfer seat base locking mechanism 22 is a variable locking assembly 81 that includes a locking pinion 97, a lock plate assembly 98, a centering assembly 99 and a lock actuator assembly 100. Referring to FIGS. 7-13, locking pinion 97 is a pinion gear configured to mesh with rack 84 and defining a central hole 104 and a plurality of identically sized locking holes 105, the centers of which all lie on a common circle 106. In the present embodiment, there are 14 holes 105, but locking pinion 97 may be configured with more or fewer holes 105, as desired. At its top, each hole 105 is chamfered at about a 45 degree angle a short distance (e.g. about 1.0 mm) down from the top surface 107 of locking pinion 97. Each resulting chamfered surface 109 intersects the top surface 107 of locking pinion 97 to form a chamfer circle 111. Locking holes 105 are spaced apart a sufficient distance 112 to maintain the strength and integrity of locking pinion 97 under the loads and stresses to which it is to be subjected, and are positioned close enough together so that the chamfer circles 111 of each pair of adjacent holes (e.g. 113 and 114) are substantially in tangential abutment at a junction 115 (which is generally a point). Alternative embodiments are contemplated wherein each pair of adjacent holes 113 and 114 is slightly closer to one another and/or its chamfers are slightly deeper (FIGS. 14 and 15) and/or there is some other alternative configuration so that their chamfer circles 111 slightly overlap, whereupon their mutual intersection is slightly below the locking pinion top surface 107 and forms a short junction line 118 (as opposed to a point).

Referring to FIGS. 7-10, 16 and 17, lock plate assembly 98 includes a round plate 120 with top and bottom surfaces 121 and 122, respectively, an upper block 123 centered and fixedly mounted to the top surface 121, and a post 125 having an axis 126 (FIG. 11) and being fixed to and extending upwardly from base plate 90. Plate 120 includes a plurality of locking pins 124 extending downwardly from the bottom surface 122. Plate 120 and upper block 123 (FIG. 17) define central holes 127 and 128, respectively, that have a common axis 129 and that are of the same diameter as the hole 104 of locking pinion 97. Block 123 has a generally rectangular cross-section and has opposing connector sides 132 and 133 that have a width ($W_B$) and opposing contact sides 134 and 135 that have a length ($L_B$), the width ($W_B$) and length ($L_B$) lying in a plane essentially parallel to top surface 121. Together the width ($W_B$) and length ($L_B$) form a block tolerance dimension 138 comprising $W_B \times L_B$. Locking pins 124 are each tapered at their bottom ends to form a registry tip 140, the taper being at an angle of between about 40 and 50 degrees and generally being to a point 141. In the preferred embodiment, registry tip 140 is tapered at a 45 degree angle. There are seven locking pins 124, the axes of which are spaced out in a circle 142 that is coaxial with central hole 127 and that is sized so that, when locking plate assembly 98 is in coaxial alignment with and above locking pinion 97, one or both of locking pinion 97 and lock plate assembly 98 can be rotated about their axes 129 (in assembly) whereby the seven locking pins 124 are brought into alignment with any alternate series of holes 105 (that is, every other hole 105) of locking pinion 97 (as seen in FIG. 9).

The holes 104, 127 and 128 of locking pinion 97, plate 120 and block 123 are all the same diameter and receive therethrough post 125 in a stack atop base plate 90 and with locking pinion 97 being in meshing engagement with rack 84. More specifically, in assembly, locking pinion 97 sits upon base plate 90 and over post 125. That is, post 125 extends through the hole 104 of locking pinion 97 and constrains locking pinion 97 in meshing engagement with rack 84, as shown. Also received over post 125 and above locking pinion 97 is the plate 120 and block 123 combination. Thus, post 125 extends through the central holes 127 and 128 of plate 120 and block 123 to constrain plate 120 and its locking pins 124 in alignment above the locking holes 105 of locking pinion 97.

Figures 18, 19:
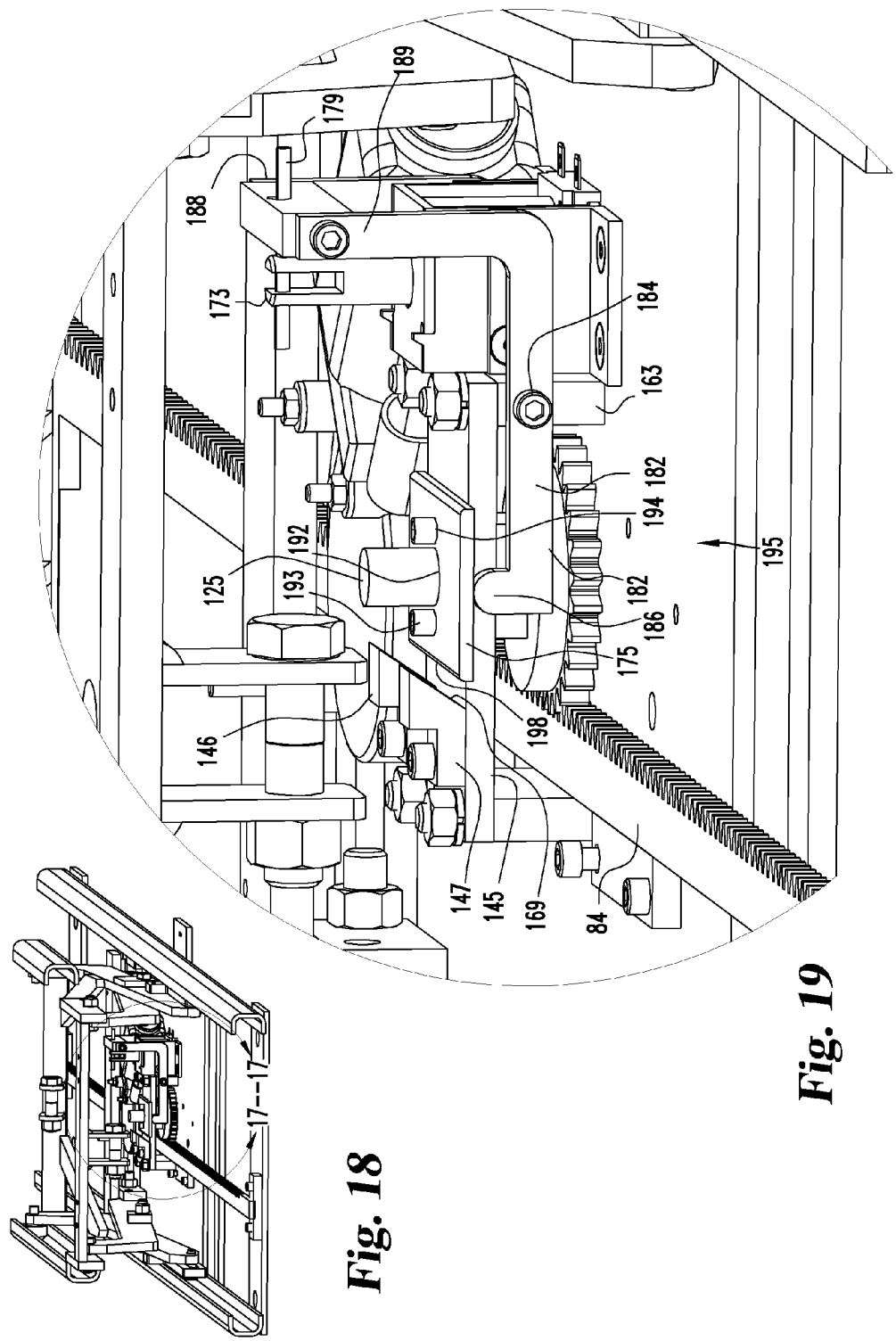
FIG. 18 is a left side and lower angled front perspective view of the transfer seat base 10 of FIG. 6, showing the location of detail enlargement for FIG. 19.
FIG. 19 is an enlarged view of a portion of the transfer seat base 10 of FIG. 18 and taken within the detail circle 19-19, and showing the rocker arms 181 and 182 in the down, locked position 195.

Referring to FIGS. 10 and 19, centering assembly 99 includes an alignment plate 145 and a pair of pre-alignment blocks 146 and 147. Alignment plate 145 defines a generally rectangular tolerance opening 148 having opposing connector sides 152 and 153 that have a width ($W_P$) and opposing contact sides 154 and 155 that have a length ($L_P$). Together, the width ($W_P$) and length ($L_P$) form a tolerance opening dimension 161 comprising $W_P \times L_P$. Alignment plate 145 is fixedly connected to base plate 90 by right and left support blocks 162 and 163, which together support alignment plate 145 in a position above the plate 120 of lock plate assembly 98 and wherein upper block 123 extends up through and in central alignment within tolerance opening 148, as shown. In one embodiment, tolerance block dimension 138 ($W_B \times L_B$) is about 0.75 inches×1.0 inches, and the tolerance opening dimension 151 ($W_P \times L_P$) is about 1.0 inches×1.5 inches so that block 123 can rotate through an alignment angle of up to about 12.8° in either direction from its center position 171

(FIG. 11). The center position is where the opposing contact sides 134 and 135 are parallel with or at least form equal angles with or are equally distanced from the corresponding contact sides 154 and 155 of the tolerance opening 148, as described herein.

Pre-alignment blocks 146 and 147 are identical and are mounted on the top surface 165 of alignment plate 145 and to the side of tolerance opening 148. Alignment blocks 146 and 147 each define a contact surface 169 that is at an angle of about 55 degrees with the top surface 165 of alignment plate 145.

Lock actuator assembly 100 includes a lift solenoid 172 with output rod 173, a rocker arm assembly 174 and a lift plate 175. Lift solenoid 172 is held in a desired position atop base plate 90 by a solenoid housing 178 that is screwed to base plate 90, as shown. The output rod 173 extends upward from solenoid 172 and through a hole in housing 178 and, at its top, includes a laterally extending push rod 179.

Rocker arm assembly 174 includes a pair of mirror-imaged, L-shaped rocker arms 181 and 182 that are pivotally mounted (at 183 and 184) to the opposing sides of left support block 163 and thus on opposing sides of alignment plate 145, as shown. Rocker arms 181 and 182 extend in one direction from their pivotal mountings at 183 and 184 to ends that form plate engagement humps 185 and 186. Rocker arms extend in the opposite direction from their pivotal mountings 183 and 184 where they turn upwardly and terminate at ends 188 and 189, which are connected together by a bar 190. Bar 190 defines a hole through which extends push rod 179.

Lift plate 175 (FIG. 19) defines a hole 192 and rests atop alignment plate 145, over tolerance opening 148 and over upper block 123. It is there secured as by screws 193 and 194 to the top of upper block 123, with post 125 extending through hole 192. Lift plate 175 is sized to extend outwardly a distance from opposing sides of alignment plate 145 sufficiently to reside above and be engaged by plate engagement humps 185 and 186, as shown.

Figure 20:
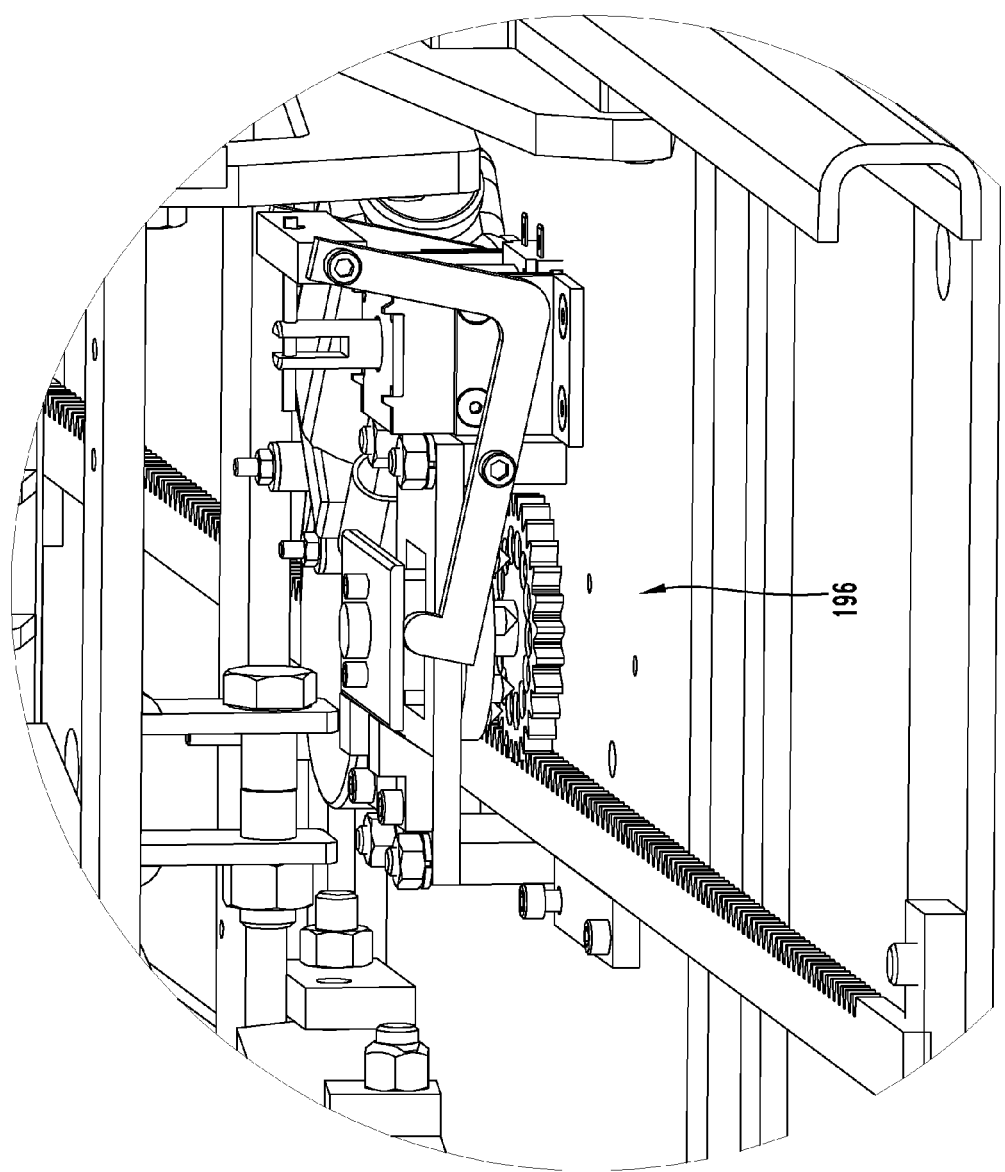
FIG. 20 is a view of the portion of the transfer seat base 10 of FIG. 19 and showing the rocker arms 181 and 182 in the up, unlocked position 196.

Variable locking assembly 81 includes a locked position 195 (FIG. 19) and an unlocked position 196 (FIG. 20). The sizes and configurations of the various components of variable locking assembly 81, including alignment plate 145, locking pinion 97, lock plate assembly 98 and its upper block 123, lift plate 175 and rocker arm assembly 174 are such that, in the locked position 194: lift solenoid 172 is inactivated and up; plate engagement humps 185 and 186 are in subjacent contact with the underside of opposing ends of lift plate 175; lift plate 175 is resting atop alignment plate 145; and round plate 120 of lock plate assembly 98 is resting atop locking pinion 97 with the seven locking pins 124 extending down into an alternate series of holes 105 (that is, every other of the 14 holes 105 is in receipt of one of the seven locking pins 124.

From the locked position, actuating switch 75 (of switch assembly 72), either forward or backward, actuates lift solenoid 172, which pulls down output rod 173 and its push rod 179, which pushes down bar 190 and the upper ends 188 and 189 of rocker arms 181 and 182, which pivots rocker arms 181 and 182 about their pivotal mountings 183 and 184, which raises humps 185 and 186 and the lift plate 175 in subjacent contact therewith. As lift plate 175 is raised, so is round plate 120 connected thereto, whereby its locking pins 124 rise out of and clear of the holes 105 of locking pinion 97, and locking pinion 97 is then free to rotate about post 125. With locking pinion 97 free to rotate, carriage frame 20 is now free to move, which occurs by the same actuation (either forward or backward) of the switch 75. That is, actuating switch 75 (1) activates variable locking assembly 81 to unlock and free locking pinion 97 for rotation and (2) activates drive motors 85 and 86 to move carriage frame 20 along rack 84.

Upon releasing switch 75, drive motors 85 and 86 cease operation, and carriage frame 20 stops moving along rack 84. Simultaneously or substantially simultaneously, activation of lift solenoid stops, and variable locking assembly 81 (and its components) return to the locked position 195 (FIG. 19). When rocker arms 181 and 182 pivot back to the locked position 195, plate engagement humps 185 and 186 fall, and lift plate 175 drops back down to rest atop alignment plate 145. Consequently, round plate 120 falls, and its locking pins 124 descend into an alternating series of holes 105 in locking pinion 97. However, when carriage frame 20 stops moving, and locking pinion 97 thus stops rotating, the set of holes 105 will likely be out of direct subjacent alignment with the set of locking pins 124 thereabove. The misalignment will be up to about 12.9° in either direction. That is, rotation of locking pinion 97 by about 25.7° (360°/14 holes=25.71°) will move the holes 105 exactly one position to either side (that is, rotation of the locking pinion 97 of FIG. 12 about 25.71° in a clockwise direction about its axis would cause hole 113 to move into the position formerly occupied by hole 114). In the worst case scenario, if locking pinion 97 stops moving, and the point 141 of registry tip 140 is directly over the junction 115 (or the junction line 118) of two holes 105, the descent of round plate 120 will result in the points 141 of the seven locking pins 124 falling upon the junctions 115 (or 118) aligned therebelow, and the locking pins 124 will fail to fall into their holes 105, and lock plate assembly 98 will not engage with and lock locking pinion 97 from rotating.

As next described, the centering assembly 99 enables lock plate assembly 98 to engage with and lock locking pinion 97, and thus carriage frame 20 and the entire transfer seat base 10, from moving, regardless of the rotational misalignment presented between the locking pinion 97 and the lock plate assembly 98 when carriage frame 20 initially stops moving.

Because the tolerance opening dimension 161 (of tolerance opening 148) is larger than the block tolerance dimension 138, block 123 and its round plate 120 and locking pins 124 are able to rotate about their central post 125. In the present embodiment, the tolerance opening dimension 161 ($W_P \times L_P$) is about 1.0 inches×1.5 inches, and the block tolerance dimension 138 ($W_B \times L_B$) is about 0.75 inches×1.0 inches. As a result, block 123 is able to rotate about post 125 within tolerance opening 148 a total of about 25.7°, or about 12.8° degrees in either direction from center position 171. This is the tolerance ratio angle.

When longitudinal movement of transfer seat base 10 is first selected by activating switch 75, the initial rotation of locking pinion 97 and the lock plate assembly 98 engaged therewith will result in the right side edge 198 of lift plate 175 (which is connected and rotates with lock plate assembly 98) engaging the sloping surface 169 of either of the two pre-alignment blocks 146 and 147 (depending on the direction in which block 123 is out of alignment). Substantially simultaneously therewith, as lift plate 175 rises, its edge 198 rides along that sloping surface 169, which rotates lift plate 175 (and lock plate assembly 98 connected thereto) to the center position 171 (FIGS. 11 and 20), which occurs when edge 198 comes in contact with the sloping surfaces 169 of both pre-alignment blocks 146 and 147. Then, when switch 75 is released, carriage frame 20 stops moving, solenoid 172 rises and lift plate 175 and its lock plate assembly 98 drop. Unless the locking pinion 97 happens to be perfectly aligned therebelow (unlikely), the points 141 and/or the tapered registry tips 140 will engage with the chamfered surfaces 109 and, by the force of its weight, lock plate assembly 98 will rotate up to the provided alignment angle of up to about 12.8°. (In the preferred embodiment, holes 105 and their chamfers are created so that the junction lines 118 of some length are created). The locking pins 124 will then be aligned over the corresponding holes 105, lock plate assembly 98 will drop into locking engagement with the locking pinion 97, and transfer seat base 10 will be in the locked position 195. The tolerance provided between block 123 and tolerance opening 148, when transfer seat base 10 is in the locked position 195, would enable carriage frame 20 to move longitudinally about 0.6 inches in this embodiment, but such movement would only occur in the event of a high force impact. That is, the drive motors 85 and 86 (when idle) restrain carriage frame 20 from moving longitudinally during normal operation of the vehicle, including during normal acceleration and braking actions. In the event of a high force impact, such as a crash, it is the variable locking assembly 81 that operates to hold carriage 20, seat 13 and the occupant therein stationary (except for the up to about 0.6 inches) along a longitudinal axis.

Alternative embodiments are contemplated wherein there are more or fewer holes 105, in which case the block tolerance dimension 138 and/or the tolerance opening dimension 161 and/or the block tolerance dimension 138 will vary to enable sufficient rotation of lock plate assembly 98 (that is, if there are 16 holes, 360°/16=a total alignment angle of about 22.5°).

Pre-alignment blocks 146 and 147 can be mounted in a position other than as shown and can be configured alternately, so long as they function to engage with lift plate 175 as it is lifted and rotate lift plate 175 back to its centered position 171. In one embodiment, pre-alignment blocks 146 and 147 are made of Delrin or a similar low friction material to facilitate the centering action between blocks 146/147 and lift plate 175.

Alternative embodiments are contemplated wherein upper block 123 and/or tolerance opening 148 have shapes other than the rectangular shapes shown, so long as lock plate assembly 98 is similarly allowed by the block or similar structure to rotate about post axis 126 through the needed alignment angle to enable full engagement of locking pins 124 in holes 105.

Referring to FIG. 1, carriage frame 20 of transfer seat base 10 also includes a foot rest 205 rigidly connected with the top plate assembly 37 so that it extends forwardly of seat 13 and moves laterally with carriage frame 20, but does not rotate with seat 13.

Transfer seat bases enable handicap persons who have less than full use and control of their legs to more easily operate a motor vehicle. One way to preclude such user's legs from inadvertently engaging and activating the vehicle's pedals (i.e. gas pedal, brake pedal, etc.) is to position a barrier between the location of the driver's feet and legs and the vehicle pedals.

Figure 21:
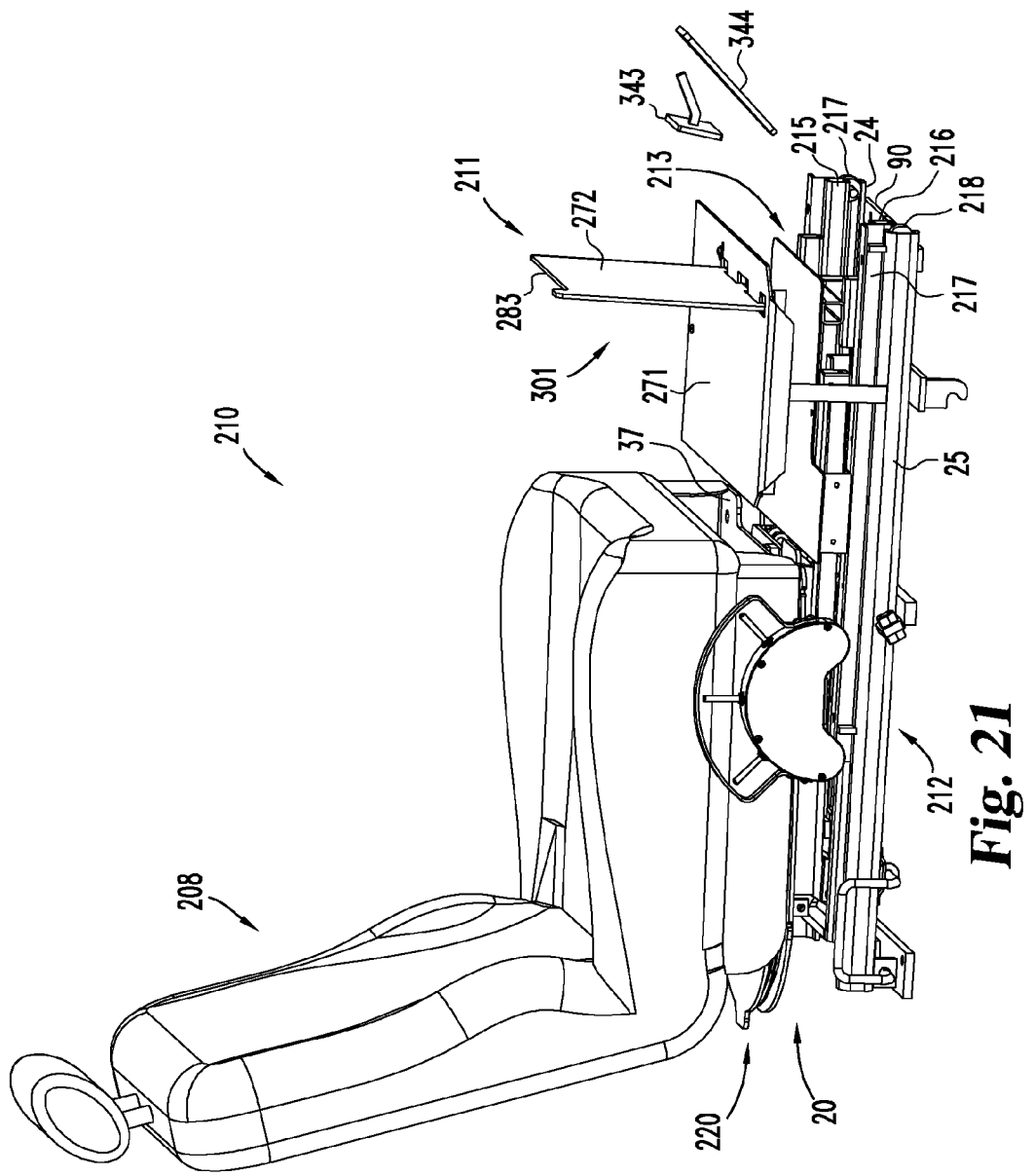
FIG. 21 is a right, front perspective view of a transfer seat base 210 in accordance with the present invention and including a folding pedal guard assembly 211 shown in the up, guard position 301.
Figure 22:
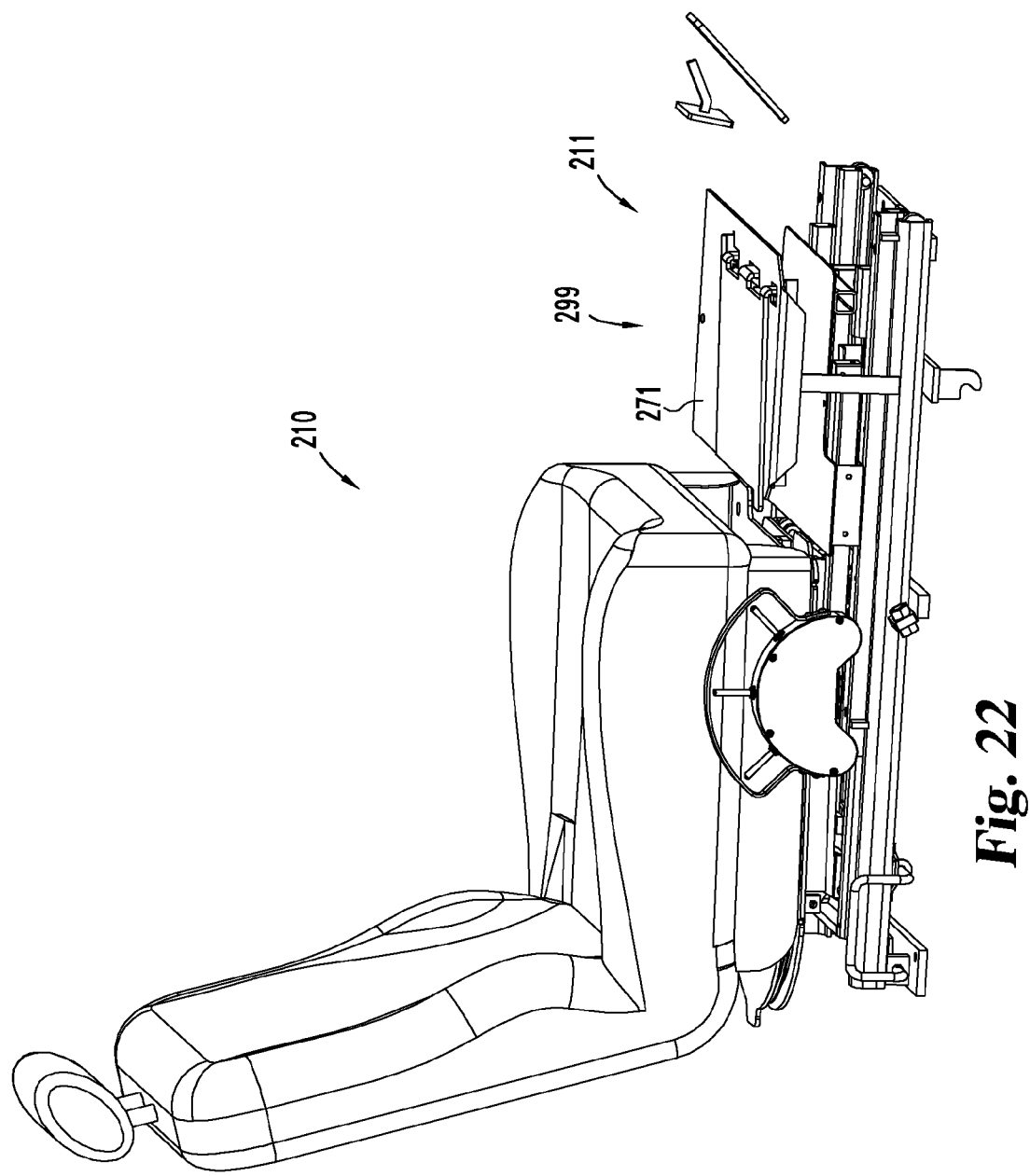
FIG. 22 is a right, front perspective view of the transfer seat base 210 of FIG. 21 with the pedal guard assembly 211 shown in the down, rest position 299.
Figure 23:
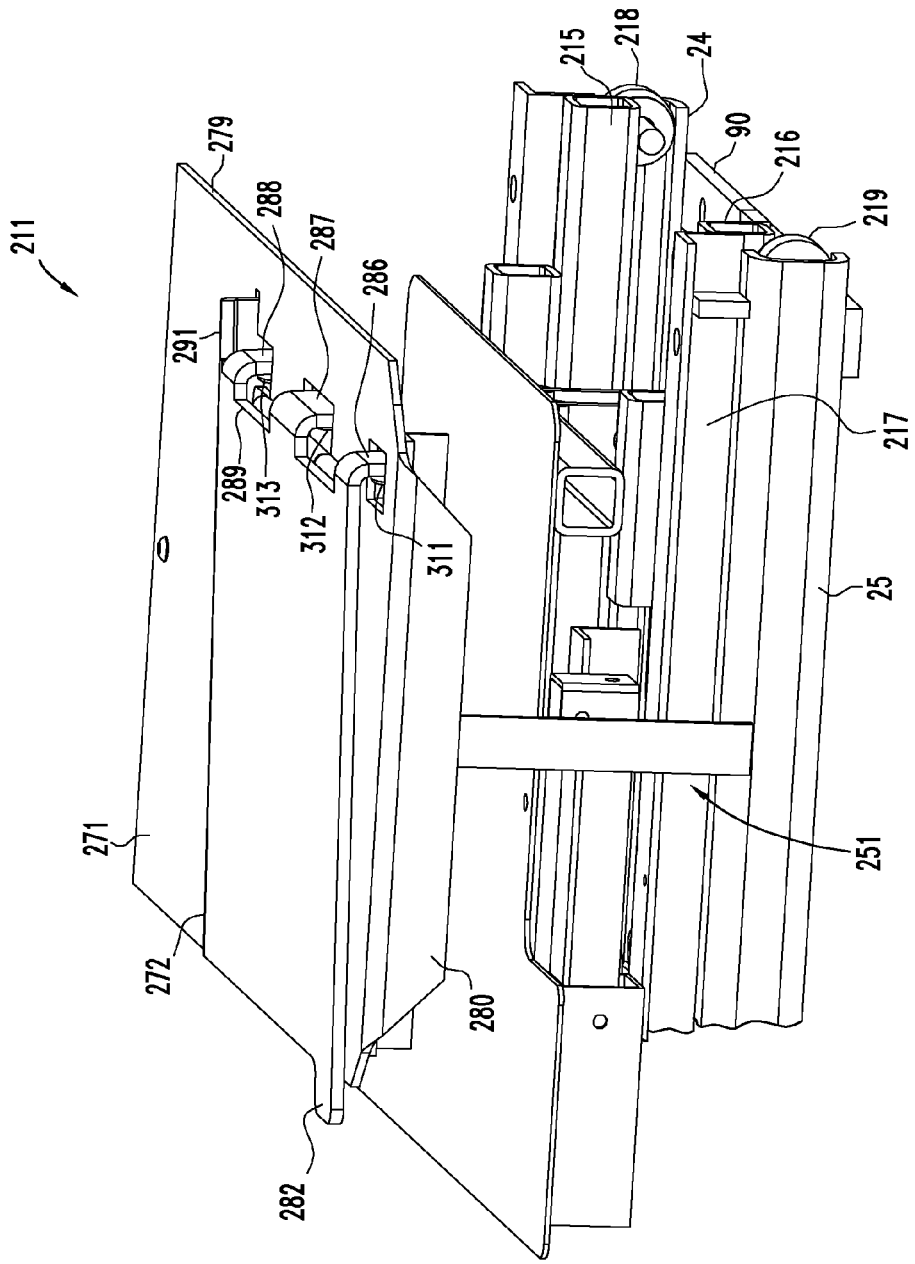
FIG. 23 is an enlarged right, front perspective view of the pedal guard assembly 211 and portions of the pedal guard mounting assembly 251 of FIG. 22.
Figure 24:
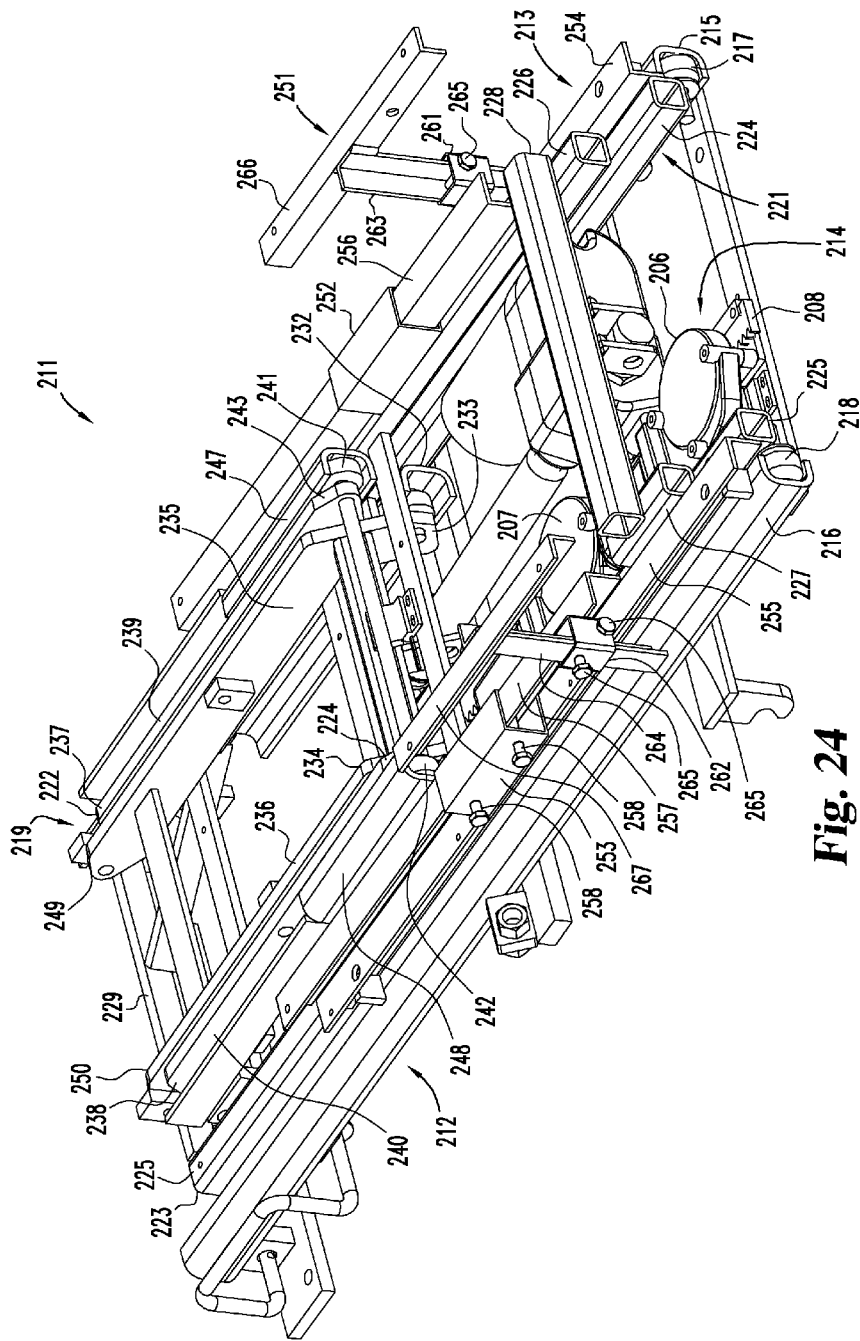
FIG. 24 is a right, front perspective view of the transfer seat base 210 of FIG. 21 and with the seat 208, the rotation assembly 220 and portions of the lift assembly 219 removed.
Figure 25:
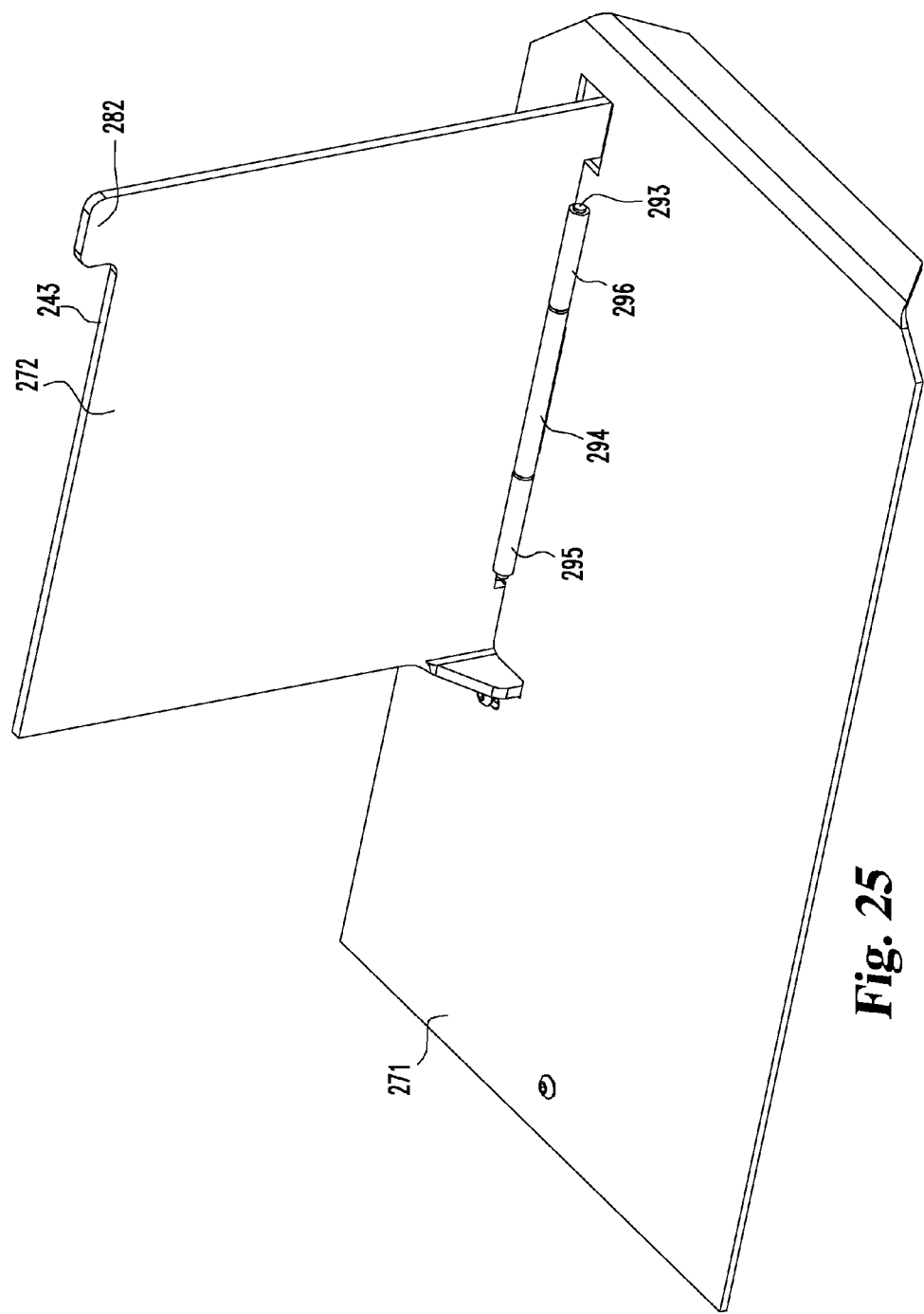
FIG. 25 is a rear right, perspective view of the pedal guard assembly 211 of FIG. 21 and shown in the up, guard position 301.
Figure 26:
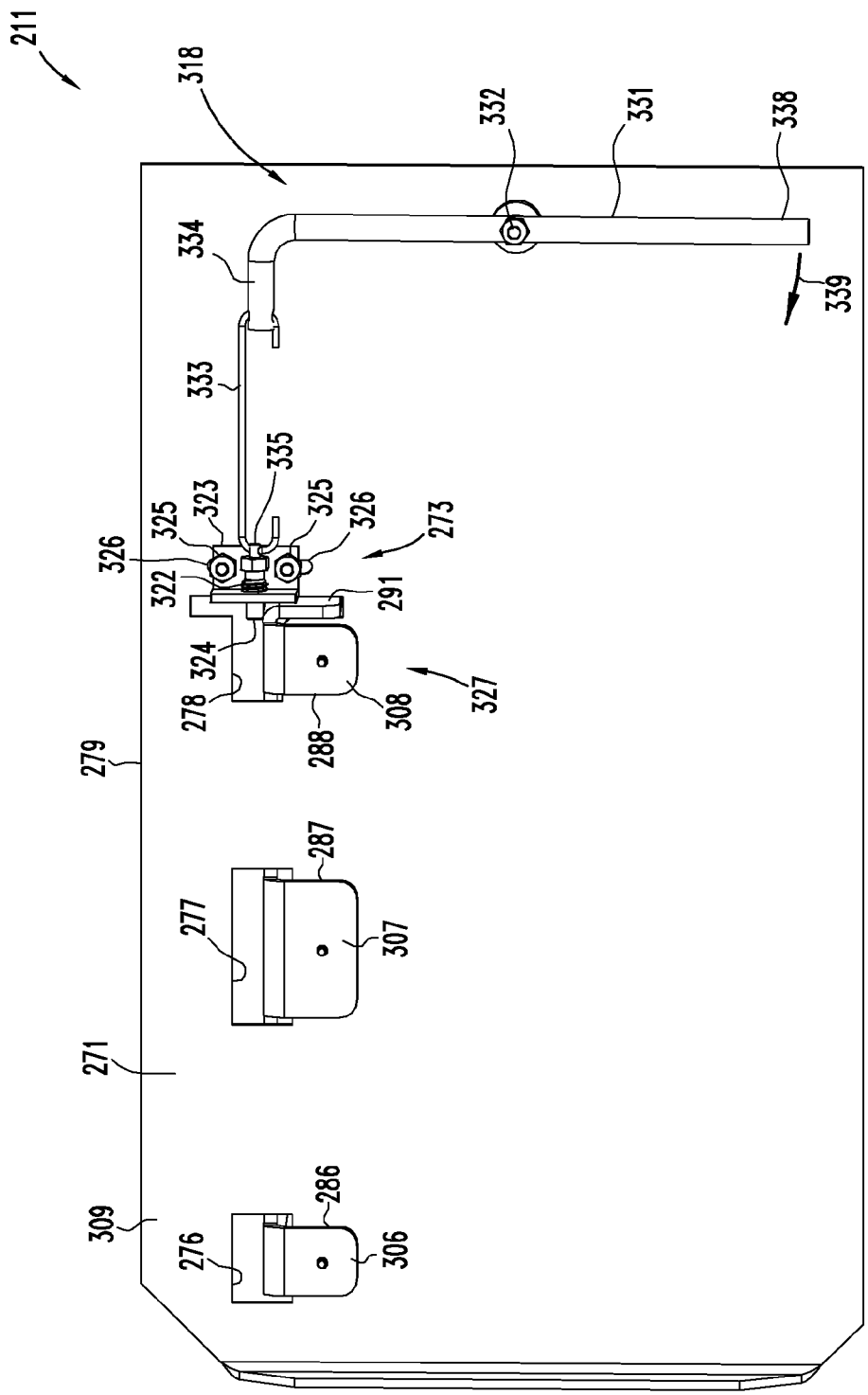
FIG. 26 is a bottom view of the pedal guard assembly 211 of FIG. 25 and shown in the up, guard position 301 and in the locked position 327.

Referring to FIGS. 21-24, there is shown a transfer seat base 210 in accordance with another embodiment of the present invention wherein transfer seat base 210 includes a pedal guard assembly 211 that is positioned to be between the vehicle pedals and a driver's legs and feet. Pedal guard assembly 211 can also serve as a footrest when its guard plate 272 is in the down, rest position 259 (as shown in FIG. 23). Transfer seat base 210 is very similar to transfer seat base 10 of FIGS. 1-20 and, in addition to the pedal guard assembly 211, it generally includes a rail frame 212, a carriage frame 213, and a motive mechanism 214 for moving carriage frame 213 along rail frame 212 between a forward driving position and a rearward occupant transfer position. The transfer seat base 210 of FIGS. 21-24 does not include a transfer seat base locking mechanism like the locking mechanism 22 of transfer seat base 10, but the present invention contemplates embodiments wherein transfer seat base 210 includes a locking mechanism, the same or substantially the same as locking mechanism 22, which would preferably be located between the drive motors 206 and 207 (FIG. 24). As with transfer seat base 10, drive motors 206 and 207 are connected with the carriage frame 213 and have pinions that engage with a toothed rack 208 that is connected with the rail frame 212 of transfer seat base 210, as described herein. Alternative embodiments are contemplated wherein motive mechanism 214 comprises any other devices that will selectively move carriage frame 213 along rail frame 212, as desired. As used herein, selective moving or movement means upon activation by a user, and with or without motorized assistance.

Various of the structural elements of transfer seat base 210 relating to its longitudinal and rotational movements are shown slightly differently than are shown in the transfer seat base 10 of FIGS. 1-20, but they are configured and connected to similarly provide longitudinal and rotational movement of a seat 208 secured atop of transfer seat base 210.

Generally, the rail frame 212 is rigidly affixed to the vehicle floor and its left and right, C-cross-sectioned rails 215 and 216 provide channels for receipt and travel of the rollers (the front two of which are shown at 217 and 218) of the carriage frame 213.

Carriage frame 213 likewise includes a lift assembly 219 (FIG. 24) and a rotation assembly 220 (FIG. 21). The scissor-type lift assembly 219 includes a base frame 221 that includes various tubing members 224-228 and a rear cross rail 229 that are rigidly connected together as by welding. Six rollers (two shown in the front at 217 and 218, two not shown that are about 8 to 10 inches forward of the rear (222 and 223, respectively) of C-cross-sectioned rails 224 and 225, and two not shown that are about midway therebetween) are affixed, three to each of the undersides of the C-cross-sectioned rails 224 and 225. With the these six rollers positioned in the opposing C-cross-sectioned rails 215 and 216, carriage frame 213 is thus able to move between the front and rear ends of rail frame 212 (it being shown at the front end in FIG. 24).

Rigidly connected to the insides of the long tubing members 224 and 225 are left and right C-cross-sectioned rails (only left C-cross-sectioned rail 232 connected to left, long tubing member 224 is shown), in which ride, in a horizontal path, the rollers of the front ends 233 and 234 of opposing inner scissor arms 235 and 236, respectively, of the lift assembly 219. The rear ends (generally at 237 and 238) of the opposing outer scissor arms 239 and 240 are rotatably connected to and near the rear of the opposing long tubing members 224 and 225, respectively. Left and right rollers 241 and 242 are connected to the front ends 243 and 244 of the outer scissor arms 239 and 240, respectively, and these two rollers 241 and 242 are received and ride within opposing C-cross-sectioned channels 247 and 248. Like the top plate assembly 37, rotation assembly 32, seat 13 and other components all connected to the scissor arms 35 and 36 of transfer seat base 10, the seat 208 and the other like components of transfer seat base 210 are connected to the C-cross-sectioned channels 247 and 248 and the rear ends 249 and 250 (of inner scissor arms 235 and 236, respectively) so that the seat 208 is raised and lowered by lift assembly 219, and so that seat 208 and the lift assembly 219 move longitudinally as a unit relative to rail frame 212, along rack 84, between a forward driving position and a rearward occupant transfer position. Also, like rotation assembly 32, rotation assembly 220 is configured and connected between lift assembly 219 and seat 208 to permit seat 208 to be rotated about a vertical axis between a forward, home position (as shown in FIG. 21) and a transfer position (not shown) rotated 90 degrees clockwise therefrom.

Carriage frame 213 also includes (or pedal guard assembly 211 also includes) a pedal guard mounting assembly 251 (FIG. 24) that is contemplated to be used with the carriage frames or assemblies of other transfer seat bases. Pedal guard mounting assembly 251 includes left and right mounting sleeves 252 and 253 that are rigidly connected to left and right angle iron members 254 and 255, which are rigidly connected to the left and right tubing members 224 and 225, respectively. Left and right horizontal mounting slides 256 and 257 (which here are made of angle iron) are slidably received with the left and right mounting sleeves 252 and 253, and their longitudinal positions can be variably fixed by bolts 258 extending through the wall of sleeves 252 and 253 and bearing against mounting slides 256 and 257. For vertical adjustment of pedal guard assembly 211, pedal guard mounting assembly 251 includes left and right short sleeves 261 and 262 that are rigidly mounted to corresponding left and right angle iron members 256 and 257, as shown. Left and right vertical mounting slides 263 and 264 are slidably received within the left and right short sleeves 261 and 262, and their vertical positions can be variably fixed by bolts 265. Left and right pedal guard mounting rails 266 and 267 are rigidly connected to the top ends of vertical mounting slides 263 and 264, as shown. Pedal guard assembly 211 is thus secured to mounting rails 266 and 267 and its position relative to the vehicle's floor and firewall (not shown) and gas pedals and brake pedals 343 and 344 (FIG. 21) and can readily be adjusted and set. Alternative embodiments are contemplated wherein the pedal guard mounting assembly 251 comprises components that mount base plate 271 to carriage frame 212, but that lack either or both vertical and longitudinal adjustment. In such cases, the components (e.g. the vertical mounting slides 263 and 264) would be of a certain dimension to connect the base plate 271 in the predesigned and fixed, non-adjustable position relative to the particular vehicle for which it is designed.

Referring to FIGS. 21, 23 and 25-27, pedal guard assembly (and foot rest) 211 generally includes a base plate 271, a guard plate 272 and a locking mechanism 273. Base plate 271 is generally flat and defines several shaped openings 276, 277 and 278 near its forward edge 279. The inner, right side edge 280 is bent downwardly to present a smooth edge at the right side of base plate 271 where a person's legs are moved into position atop the base plate 271.

Figure 29:
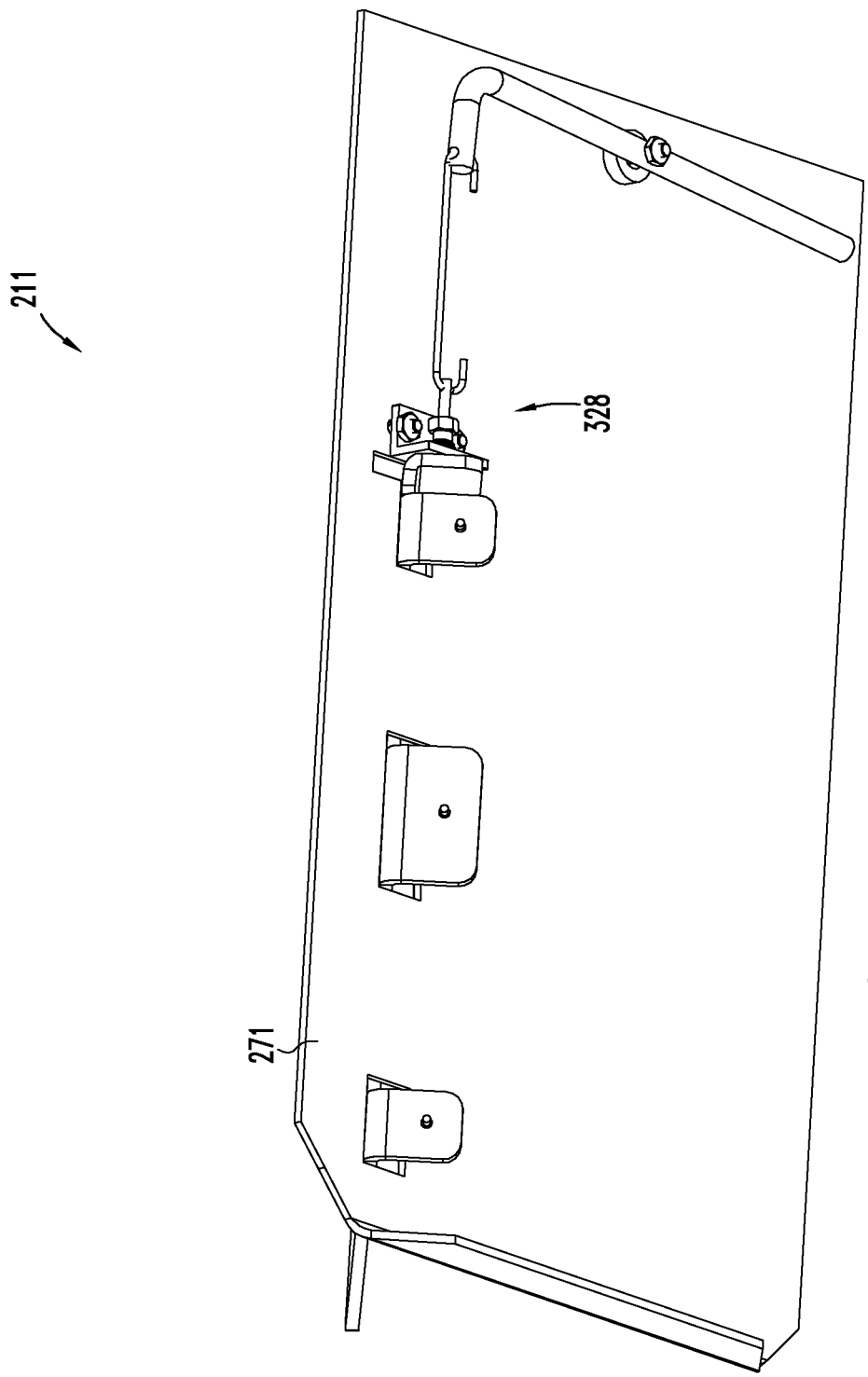
FIG. 29 is a bottom, perspective view of the pedal guard assembly 211 of FIG. 28 and with guard plate 272 shown partially pivoted between the up, guard position 301 and the down, rest position 299.
Figure 31:
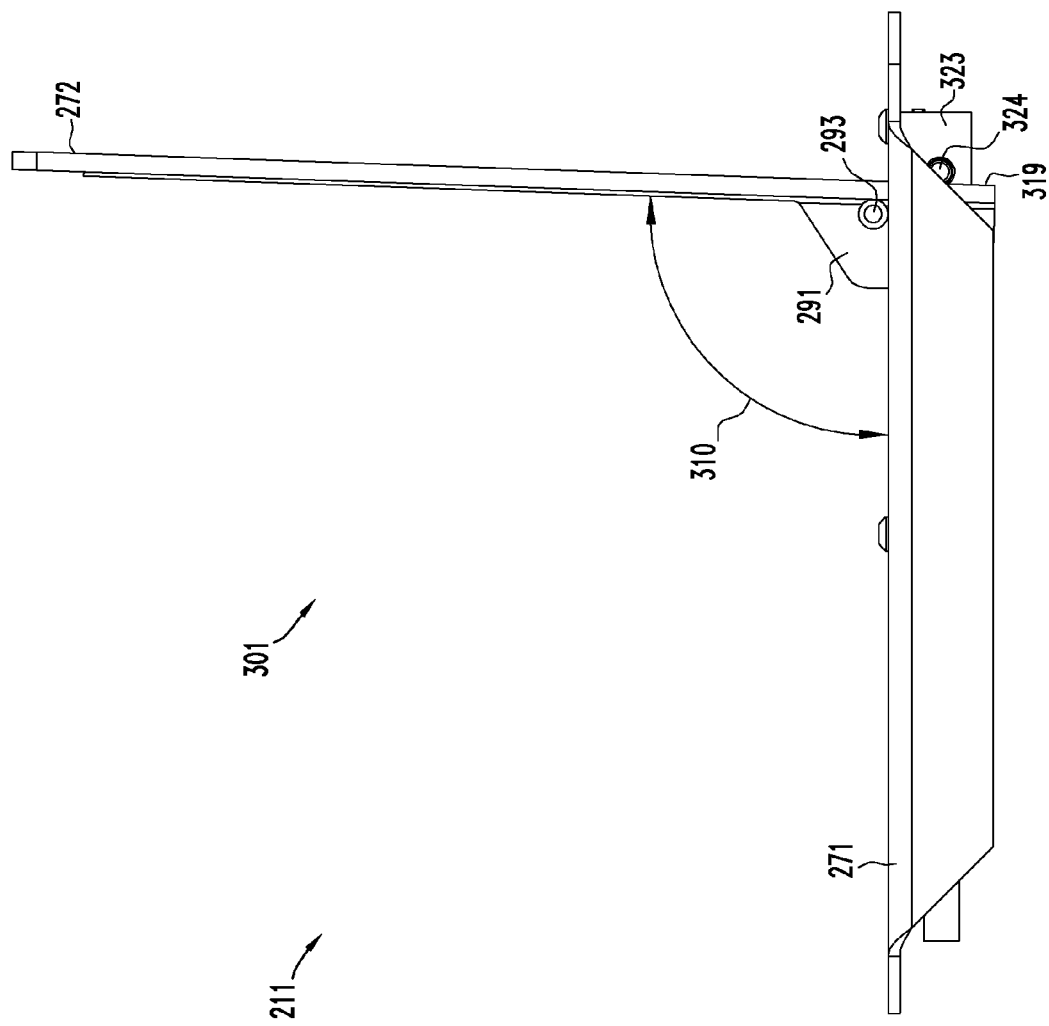
FIG. 31 is a side, elevational view of the pedal guard assembly 211 of FIG. 21 shown in the up, guard position 301.

Guard plate 272 is generally rectangular and includes a lift tab 282 extending upwardly from its upper edge 283, three positioning legs 286, 287 and 288 extending downwardly from its bottom edge 289, and a locking flange 291 extending from its lower, outside corner, as shown. A hinge pin 293 (FIGS. 25 and 31) extends through a guard plate hinge sleeve 294 (that is fixed to the lower portion of guard plate 272) and base plate hinge sleeves 295 and 296 (that are coaxially fixed to the forward portion of base plate 271) to hingedly connect guard plate 272 to base plate 271 so that it can pivot between a down, rest position 299 (FIG. 22) and an up, guard position 301 (FIG. 21). The angle guard plate 272 forms with base plate 271 is referred to as the plate angle, and the guard plate 272 forms a down plate angle of about 0 degrees when in the down, rest position 299. Each of the positioning legs 286-287 extends downwardly from lower edge 289, through a corresponding and aligned opening 276-278, respectively, and then bends rearwardly about 86 degrees to form positioning stops 306-308, respectively. Upon pivoting guard plate 272 up from its down, rest position 299, when its positioning stops 306-308 engage with the underside (bottom surface) 309 of base plate 271, guard plate 272 can be pivoted no more, and its up, guard position 301 is thus defined. The angle of the bend in positioning legs 286-288 to form positioning stops 306-308 thus defines the angle of guard plate 272 relative to base plate 271 (the plate angle), in its up, guard position 301. With positioning stops 306-308 being bent about 86 degrees to thus form an angle of about 94 degrees relative to the main, upper portion of guard plate 272, guard plate 272 thus forms a plate angle 310 (FIG. 31) of about 94 degrees with base plate 271 (FIG. 29). The more obtuse the angle formed by positioning stops 306-309 relative to the upper portion of guard plate 272, the more obtuse the angle will be formed by guard plate 272 relative to base plate 271 when in the up, guard position 301. Guard plate 272 forms an up plate angle 310 of between about 90 degrees and 130 degrees, with a preferred up plate angle 310 of between about 105 and 125 degrees, and an optimum preferred up plate angle 310 of about 115 degrees. Cushions or bumpers 311-313 (FIG. 23) are affixed to the upper (or rearward, depending on the angle of pivot of guard plate 272 at the time) sides of positioning stops 306-308 to provide a cushioned engagement between positioning stops 306-308 and the underside 309 of base plate 271 when guard plate 272 reaches the up, guard position 301.

Figure 27:
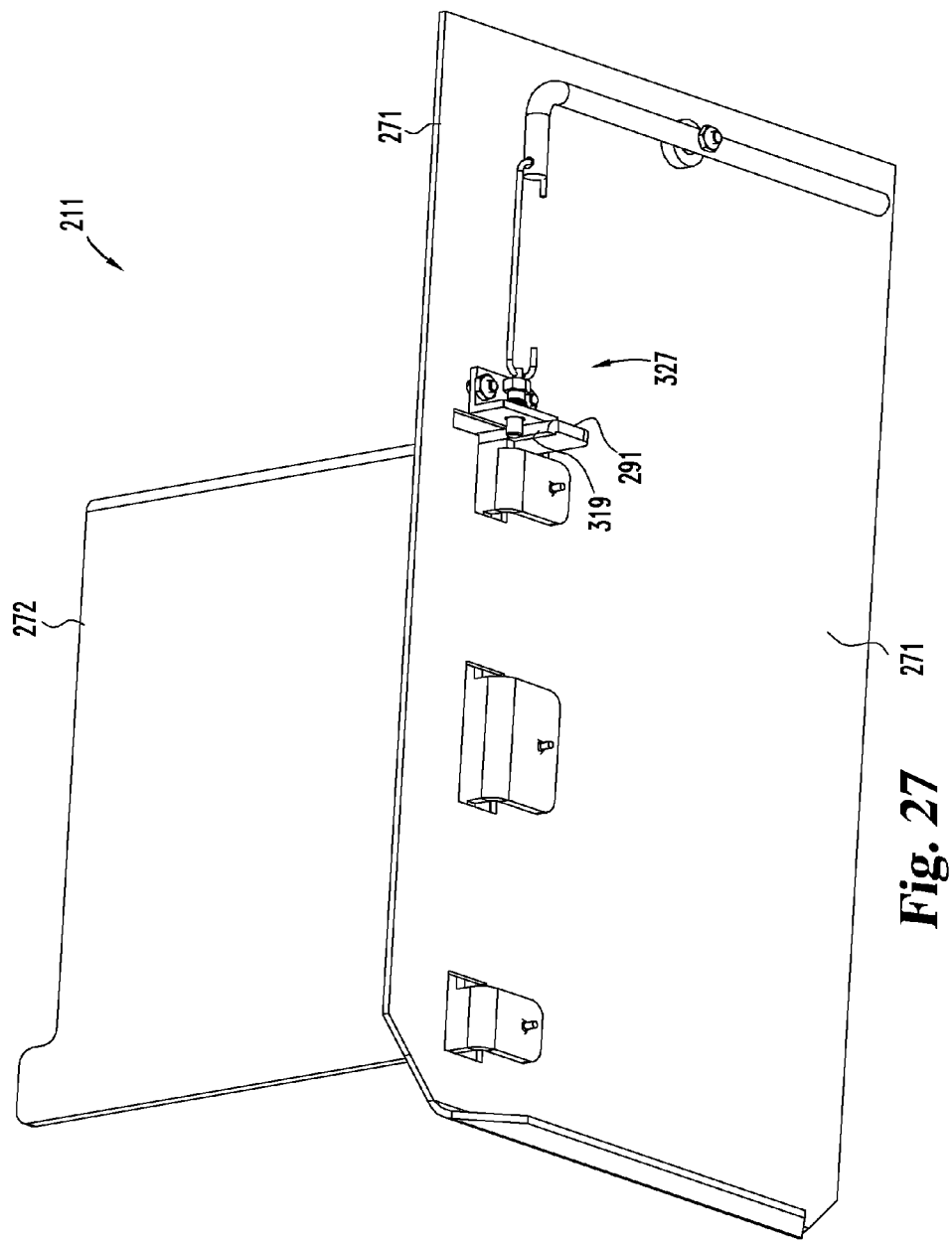
FIG. 27 is bottom, perspective view of the pedal guard assembly 211 of FIG. 26
Figure 28:
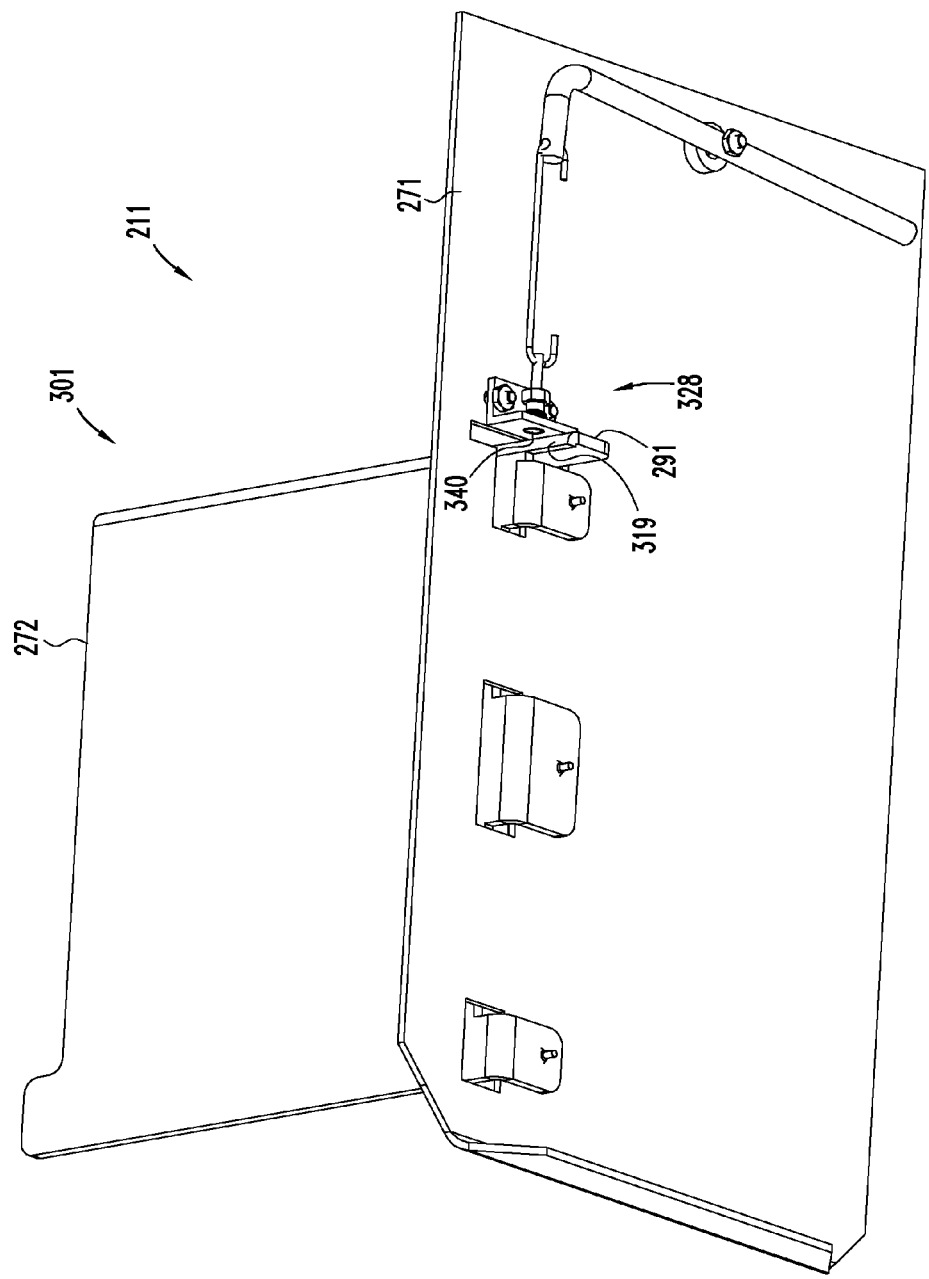
FIG. 28 is bottom, perspective view of the pedal guard assembly 211 of FIG. 27 and with the locking mechanism 273 shown in the unlocked position 328.

Locking mechanism 273 includes a locking pin assembly 317, a release mechanism 318 and the locking flange 291 of guard plate 272. The leftmost opening 278 in base plate 271 is T-shaped to provide clearance for movement of locking flange 291. When in the up, guard position 301, locking flange 291 extends down below the bottom surface 309 of base plate 271 and there defines a forward locking edge 319. Locking pin assembly 317 includes a carrier sleeve 322 connected to the underside 309 of base plate 271 by a bracket 323. A locking pin 324 is held by carrier sleeve 322 for lateral movement between a locked position 327 (FIGS. 26 and 27) and an unlocked position 328 (FIG. 28). In the locked position 327, guard plate 272 is pivoted to its up, guard position 301, and locking pin 324 is all the way to the left (as viewed in FIGS. 26 and 27), it being biased thereto by a spring (not shown, but inside of carrier sleeve 322), and whereby pin 324 is thus engaged with the forward, locking edge 319 of locking flange 291. Guard plate 272 is thus precluded from pivoting downwardly, toward its down, rest position and is locked in the up, guard position 301.

Bracket 323 is mounted by appropriate means, such as screws 325 through slots 326 defined in base plate 271, to be longitudinally adjustable and thus facilitate ready assembly and adjustment of the position of locking pin 324 relative to the forward, locking edge 319. Similarly, the carrier sleeve 322 holding locking pin 324 is threadedly held by bracket 323 to permit ready lateral adjustment of the position of locking pin 324 relative to the forward, locking edge 319.

Figure 30:
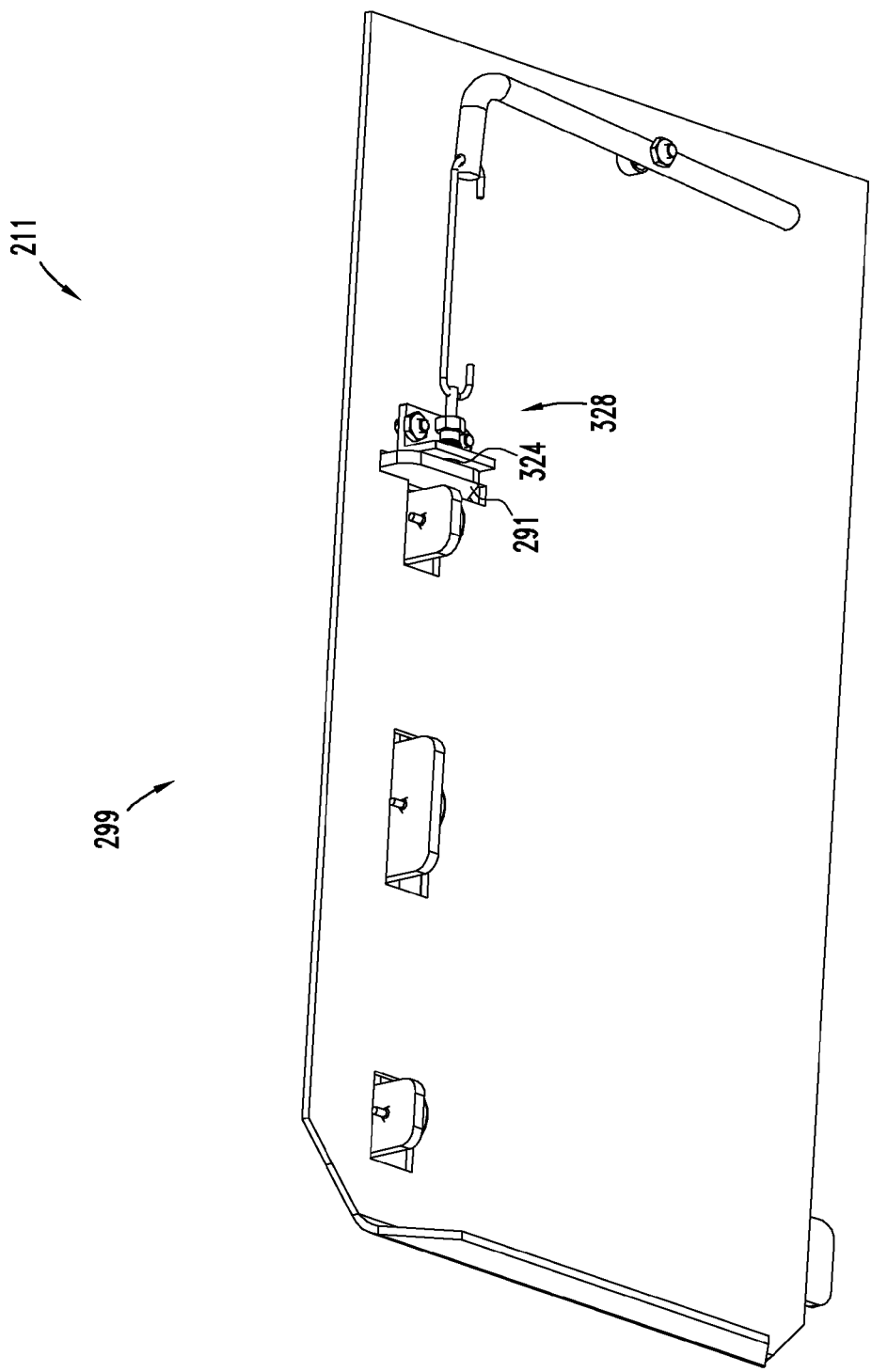
FIG. 30 is a bottom, perspective view of the pedal guard assembly 211 of FIG. 28 and with guard plate 272 shown in the down, rest position 299.

Release mechanism 318 includes a lever 331 pivotally mounted by a pin 332 at about its midpoint to the underside 309 of base plate 271. A connector link 333 is connected between the forward end 334 of lever 331 and the back end 335 of locking pin 324. To unlock guard plate 272, a user manually pushes the rearward end 338 of lever 331 (in the direction of arrow 339), which pivots lever 331 about pin 332, pulls forward end 334, link 333 and locking pin 324 to the right (as viewed in FIG. 26), whereby locking pin 324 moves out of engagement with the forward, locking edge 319 of locking flange 291 (FIG. 28), and guard plate 272 is then free to pivot from the up, guard position 301 (FIGS. 21 and 28) toward and to the down, rest position 299 (FIGS. 22 and 30). As shown in FIGS. 27-29, locking flange 291 extends downwardly enough and is configured so that when locking pin 324 is pulled to its unlocked position 328 and guard plate 272 is pivoted from its up, guard position 261 to its down, rest position 299, locking flange passes over and covers the distal end 340 (that is, the leftmost end as viewed in FIG. 28) of locking pin 324. Thus, locking flange 391 holds locking pin 324 in its withdrawn, unlocking position when guard plate 272 is in the down, rest position 259. To pivot guard plate 272 from the down, rest position 299 to the up, guard position 301, guard plate 272 is simply pivoted toward its up, guard position 301, whereupon locking flange 291 pivots away from the distal end 340 of locking pin 324 (from FIG. 29 to FIG. 28), whereupon pin 324 is pushed outwardly (to the left in FIG. 28), by the spring (not shown) inside carrier sleeve 322, to its locked position 327 (FIG. 27).

Alternative embodiments are contemplated wherein release mechanism 318 employs structures or configurations other than lever 331 to selectively pull pin 324 from its locking engagement with the forward, locking edge 319 of locking flange 291. For example, lever 331 could be replaced with a straight rod (not shown) with a knob or other structure accessible at the left side of base plate 271. Such alternative structure could be entirely manual (as with lever 331) or it could include partially or entirely automated, as with a servomechanism.

When in the down, rest position 299, guard plate 272 rests generally flat against base plate 271 and out of the way of an able-bodied driver, who can use the flattened guard plate 272 as a foot rest. When in the up, guard position 301, guard plate 272 blocks access to the vehicle's pedals (e.g. brake pedal 343 and gas pedal 344) to prevent inadvertent contact therewith by a handicapped driver who may not have complete control over his legs or feet.

In assembly and installation, transfer seat base 210 is sized and configured so that rail frame 212 is secured in an appropriate position to the floor (or similar structure) of the vehicle and proximal the vehicle's steering wheel and controls. With the carriage frame 213 all the way forward, which position is shown in FIG. 24 with the front most rollers 217 and 218 at the front end of C-cross-sectioned rails 215 and 216, the pedal guard assembly 211 is adjusted via the pedal guard mounting assembly 251. It is preferred that such adjustment includes the base plate 271 of pedal guard assembly 211 be slightly below the lowest of the vehicles pedals 343 and 344 and that the forward edge 279 of base plate 271 just contact the vehicle's firewall (not shown). It is also naturally important that such positioning include that, in the up, guard position 301, neither base plate 271 or guard plate 272 is or can contact or engage with either of pedals 343 and 344 (or other pedals that may there exist).

The length and width of base plate 271 and guard plate 272 may be varied as desired to best accommodate both the intended driver and the vehicle in which transfer seat base 210 is to be installed. For example, base plate 271 is generally shown in FIG. 21 to have a length (from the its rear edge closest to seat 208 to its forward edge 279 (FIG. 23)), but alternative embodiments are contemplated where its length is longer than shown to provide a longer surface upon which the driver can rest his/her feet.

The pedal guard/foot rest 211 is shown in use with the transfer seat base 210 of FIGS. 21-31, but alternative embodiments are contemplated wherein the pedal guard/foot rest 211 and its means for horizontal and vertical adjustment via pedal guard mounting assembly 251 is operatively connected with transfer seat base 10 of FIGS. 1-20 or with any other transfer seat base for a vehicle.

Alternative embodiments are contemplated wherein there are more or fewer of the positioning legs 286-288 and wherein the one or more positioning legs extend outside of and to the side(s) of the base plate 271 instead of through shaped opening, such as at 276-278. Alternative embodiments are also contemplated wherein the one or more positioning legs have different a configuration, such as a tab, post or other shape that instead extends on the forward side (as viewed in FIG. 21) and engages with the top surface of base plate 271 to stop clockwise pivoting (as view in FIG. 21) of guard plate 272 when it reaches the desired up, guard angle. Alternative embodiments are also contemplated wherein the mechanism by which the pivoting of guard plate 272 is prevented past the desired up, guard angle is provided in other manners, such as in the hinged connection between guard plate 272 and base plate 271.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. A transfer seat base for a vehicle having a floor, comprising:
   a rail frame configured for connection to the vehicle floor;
   a carriage frame mounted for longitudinal movement relative to said rail frame and including a top plate for receipt of a seat mountable thereto, a lift assembly for enabling selective vertical movement of the top plate relative to said rail frame, and a rotation assembly for enabling selective rotation of the top plate relative to said rail frame;
   a motive mechanism for selectively moving said carriage frame along said rail frame between a forward driving position and a rearward occupant transfer position; and
   a pedal guard assembly including a base plate connected to said carriage frame, a guard plate hingedly connected to the base plate to pivot between a down, rest position and an up, guard position and a locking mechanism for releasably locking the guard plate in the up, guard position, and wherein the down, rest position includes the guard plate having a down plate angle relative to the base plate of about 0 degrees and the up, guard position includes the guard plate having an up plate angle relative to the base plate of between about 90 and 130 degrees.

2. The transfer seat base for a vehicle of claim 1 wherein the locking mechanism includes a locking pin assembly mounted to the base plate and having a locking pin selectively and lockingly engageable with the guard plate.

3. The transfer seat base for a vehicle of claim 2 wherein the locking mechanism includes a release mechanism for disengaging the locking pin from locking engagement with the guard plate.

4. The transfer seat base for a vehicle of claim 3 wherein the locking mechanism includes the guard plate having a locking flange, and wherein the up, guard position includes the locking flange extending below the base plate.

5. The transfer seat base for a vehicle of claim 4 further including locked and unlocked positions, the locked position including the guard plate being in its up, guard position and the locking pin extending in a locked position against the locking flange to prevent guard plate from pivoting from its up, guard position toward its down, rest position.

6. The transfer seat base for a vehicle of claim 5 wherein the unlocked position includes the locking pin being withdrawn sufficiently away from the locking flange to permit the guard plate to pivot from its up, guard position toward its down, rest position.

7. The transfer seat base for a vehicle of claim 6 wherein the locking pin is mechanically biased toward its locked position.

8. The transfer seat base for a vehicle of claim 3 wherein the release mechanism includes a lever pivotally mounted to the base plate, the lever having a first end mechanically connected to the locking pin to pull the locking pin out of engagement with the guard plate.

9. The transfer seat base for a vehicle of claim 1 wherein the base plate has an underside and defines at least one opening and the guard plate includes at least one positioning leg extending down through a corresponding one of said at least one opening, and wherein the positioning leg is configured relative its guard plate to engage with the underside of the base plate and prevent further pivoting of the guard plate relative to the base plate and thus define the up plate angle.

10. The transfer seat base for a vehicle of claim 1 wherein the up, guard position includes the guard plate having an up plate angle of between about 105 and 125 degrees.

11. The transfer seat base for a vehicle of claim 10 wherein the up plate angle is about 115 degrees.

12. The transfer seat base for a vehicle of claim 1 wherein said pedal guard assembly includes a pedal guard mounting assembly for adjustably connecting the base plate to the carriage frame.

13. The transfer seat base for a vehicle of claim 12 wherein the pedal guard mounting assembly permits both vertical and longitudinal adjustment of the base plate relative to the carriage frame.

14. A pedal guard assembly for connection to a transfer seat base of a vehicle, comprising:
    a base plate configured for mounting to the transfer seat base of a vehicle;
    a guard plate hingedly connected to the base plate to pivot between a down, rest position and an up, guard position; and
a locking mechanism for releasably locking the guard plate in the up, guard position; and
    wherein the down, rest position includes the guard plate having a down plate angle relative to the base plate of about 0 degrees and the up, guard position includes the guard plate having an up plate angle relative to the base plate of between about 90 and 130 degrees.

15. The pedal guard assembly for connection to a transfer seat base of a vehicle of claim 14 wherein the locking mechanism includes a locking pin assembly mounted to the base plate and having a locking pin selectively and lockingly engageable with the guard plate.

16. The pedal guard assembly for connection to a transfer seat base of a vehicle of claim 15 wherein the locking mechanism includes a release mechanism for disengaging the locking pin from locking engagement with the guard plate.

17. The pedal guard assembly for connection to a transfer seat base of a vehicle of claim 16 wherein the locking mechanism includes the guard plate having a locking flange, and wherein the up, guard position includes the locking flange extending below the base plate.

18. The pedal guard assembly for connection to a transfer seat base of a vehicle of claim 17 further including locked and unlocked positions, the locked position including the guard plate being in its up, guard position and the locking pin extending in a locked position against the locking flange to prevent guard plate from pivoting from its up, guard position toward its down, rest position.

19. The pedal guard assembly for connection to a transfer seat base of a vehicle of claim 18 wherein the unlocked position includes the locking pin being withdrawn sufficiently away from the locking flange to permit the guard plate to pivot from its up, guard position toward its down, rest position.

20. The pedal guard assembly for connection to a transfer seat base of a vehicle of claim 19 wherein the locking pin is mechanically biased toward its locked position.

21. The pedal guard assembly for connection to a transfer seat base of a vehicle of claim 16 wherein the release mechanism includes a ever pivotally mounted to base plate, the lever having a first end mechanically connected to the locking pin to pull the locking pin out of engagement with the guard plate.

22. The pedal guard assembly for connection to a transfer seat base of a vehicle of claim 14 wherein the base plate has an underside and defines at least one opening and the guard plate includes at least one positioning leg extending down through a corresponding one of said at least one opening, and wherein the positioning leg is configured relative its guard plate to engage with the underside of the base plate and prevent further pivoting of the guard plate relative to the base plate and thus define the up plate angle.

23. The pedal guard assembly for connection to a transfer seat base of a vehicle of claim 14 wherein the up, guard position includes the guard plate having an up plate angle of between about 105 and 125 degrees.

24. The pedal guard assembly for connection to a transfer seat base of a vehicle of claim 23 wherein the up plate angle is about 115 degrees.

25. The pedal guard assembly for connection to a transfer seat base of a vehicle of claim 14 wherein said pedal guard assembly includes a pedal guard mounting assembly for adjustably connecting the guard plate to the base plate.

26. The pedal guard assembly for connection to a transfer seat base of a vehicle of claim 25 wherein the pedal guard mounting assembly permits both vertical and longitudinal adjustment of the guard plate relative to the base plate.

27. In a vehicle having pedals and a floor, a method for restricting access to the pedals, comprising the steps of:
    providing a transfer seat base including:
        a rail frame configured for connection to the vehicle floor;
        a carriage frame mounted for longitudinal movement relative to said rail frame and including a top plate for receipt of a seat mountable thereto, a lift assembly for enabling selective vertical movement of the top plate relative to said rail frame, and a rotation assembly for enabling selective rotation of the top plate relative to said rail frame;
        a motive mechanism for selectively moving said carriage frame along said rail frame between a forward driving position and a rearward occupant transfer position;
        a pedal guard assembly including a base plate connected to said carriage frame, a guard plate hingedly connected to the base plate to pivot between a down, rest position and an up, guard position and a locking mechanism for releasably locking the guard plate in the up, rest position;
    mounting the transfer seat base to the vehicle floor; and
    pivoting the guard plate from the down, rest position to the up, guard position until the locking assembly automatically locks the guard plate in a locked position.

28. The method for restricting access to the pedals of claim 27 wherein the providing step includes the locking mechanism including a locking pin assembly mounted to the base plate and having a locking pin selectively and lockingly engageable with the guard plate.

29. The method for restricting access to the pedals of claim 28 wherein the providing step includes the pedal guard assembly having a release mechanism for disengaging the locking pin from locking engagement with the guard plate.

30. The method for restricting access to the pedals of claim 29 wherein the providing step includes the release mechanism having a lever pivotally mounted to base plate, the lever having first and second ends, the first end being mechanically connected to the locking pin to pull the locking pin out of engagement with the guard plate.

31. The method for restricting access to the pedals of claim 29 further including unlocking the guard plate from the locked position by pushing the second end of the lever to pivot the lever and pull the locking pin out engagement with the guard plate.

* * * * *